United States Patent
Omeragic et al.

(10) Patent No.: US 10,914,861 B2
(45) Date of Patent: Feb. 9, 2021

(54) INVERSION-BASED WORKFLOW FOR CONSISTENT INTERPRETATION OF NUCLEAR DENSITY IMAGES IN HORIZONTAL WELLS

(71) Applicant: SCHLUMBERGER TECHNOLOGY CORPORATION, Sugar Land, TX (US)

(72) Inventors: Dzevat Omeragic, Lexington, MA (US); Hui Xie, Katy, TX (US); Tarek M. Habashy, Burlington, MA (US); Sushil Shetty, Arlington, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/027,007

(22) PCT Filed: Oct. 6, 2014

(86) PCT No.: PCT/US2014/059211
§ 371 (c)(1),
(2) Date: Apr. 4, 2016

(87) PCT Pub. No.: WO2015/051350
PCT Pub. Date: Apr. 9, 2015

(65) Prior Publication Data
US 2016/0252648 A1    Sep. 1, 2016

Related U.S. Application Data

(60) Provisional application No. 61/887,170, filed on Oct. 4, 2013.

(51) Int. Cl.
*G01V 5/12* (2006.01)
*G01V 5/08* (2006.01)

(52) U.S. Cl.
CPC . *G01V 5/12* (2013.01); *G01V 5/08* (2013.01)

(58) Field of Classification Search
CPC ................................. G01V 5/12; G01V 5/08
See application file for complete search history.

(56) References Cited

U.S. PATENT DOCUMENTS

| | | |
|---|---|---|
| 6,594,584 B1 | 7/2003 | Omeragic et al. |
| 6,998,844 B2 | 2/2006 | Omeragic et al. |

(Continued)

FOREIGN PATENT DOCUMENTS

WO    2013066682 A1    5/2013

OTHER PUBLICATIONS

Ellis et al., "Gamma Ray Scattering and Absorption Measurements", Well Logging for Earth Scientists, 2nd ed., Dordrecht: Springer, 2007, pp. 289-321.

(Continued)

*Primary Examiner* — Kyle R Quigley

(57) ABSTRACT

Systems and methods are disclosed for well logging using radiation detection and/or emission of gamma rays. A method according to the disclosure includes collecting data from the subterranean formation using a nuclear density tool, wherein the nuclear density tool is configured to collect data to form an azimuthal image. The method further includes characterizing a section of the subterranean formation comprising data and images acquired in a high angle wellbore section, a horizontal wellbore section, or a combination thereof. The method additionally includes performing a parallel inversion using apparent densities and volumetric photoelectric factor images to build a formation model, wherein the parallel inversion comprises a high angle workflow that models high angle wellbore sections and a horizontal workflow that models horizontal wellbore sections.

21 Claims, 28 Drawing Sheets

(56) References Cited

U.S. PATENT DOCUMENTS

| 2010/0004867 A1 | 1/2010 | Zhou et al. |
| 2010/0312478 A1 | 12/2010 | Tabanou et al. |
| 2011/0106514 A1 | 5/2011 | Omeragic et al. |
| 2011/0168879 A1 | 7/2011 | Evans et al. |
| 2011/0231098 A1 | 9/2011 | Omeragic et al. |
| 2013/0261975 A1 | 10/2013 | Yang |

OTHER PUBLICATIONS

Griffiths, "Well Placement Fundamentals", Schlumberger, 2009, pp. 252-261.

Habashy et al., "A General Framework for Constraint Minimization for the Inversion of Electromagnetic Measurements", Progress in Electromagnetics Research, PIER 46, 2004, pp. 265-312.

Mendoza et al., "Inversion of Sector-Based LWD Density Measurements Acquired in Laminated Sequences Penetrated by High-Angle and Horizontal Wells", SPWLA 50th Annual Logging Symposium, Jun. 21-24, 2009, pp. 1-16.

Shetty et al., "Inversion-Based Workflows for Interpretation of Nuclear Density Images in High-Angle and Horizontal Wells", SPWLA 53rd Annual Logging Symposium, Jun. 16-20, 2012, pp. 1-16.

International Search Report and Written Opinion issued in related International App. No. PCT/US2014/059211 dated Jan. 15, 2015 (16 pages).

International Preliminary Report on Patentability issued in International Patent application PCT/PCT/US2014/059211, dated Apr. 5, 2016. 12 pages.

European Search Report R164 EPC issued in European Patnet Application 14851331.0 dated Jun. 23, 2017. 7 pages.

European Search Report R 62 EPC issued in European Patnet Application 14851331.0 dated Oct. 17, 2017. 11 pages.

Polyakob et al., 3D Reservoir Characterization Workflow Integrating High Angle and Horizontal Well Log Interpretation with Geological Models, IPTC 16828, International Petroleum Technology Conference, Beijing, China Mar. 26, 2013, pp. 26-28.

Full 2D HZ Model Parameterization

INVERSION-BASED WORKFLOW FOR CONSISTENT INTERPRETATION OF NUCLEAR DENSITY IMAGES IN HORIZONTAL WELLS

BACKGROUND

This disclosure relates to methods for the interpretation of density images in high angle and horizontal wells.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

When a well is drilled into a geological formation, a variety of measurements may be used to identify information about the geological formation. These may include density, porosity, lithology, and many others. Identifying this information for the geological formation can be useful to determine the likely presence or absence of hydrocarbons, as well as the amount of recoverable oil and/or gas reserves, for which the formation structure and the dip angle of the well through various layers of the geological formation are used. The nuclear density measurement, in particular, plays a large role in the interpretation of porosity. Logging-While-Drilling (LWD) borehole density images provide formation structural information including formation layer thickness and dip angle. However, automatic fast formation evaluation using density images in high-angle (HA) and horizontal (HZ) wells is still a challenge for petrophysicists.

The first generation of imaging tools may use nuclear density inversion-based processing including two distinct workflows. Density images are first preprocessed, then, intervals where it is possible to extract sinusoids (e.g., sine-based patterns) and estimate relative dip are processed using a first HA workflow. In intervals where tool is oriented nearly parallel to boundaries, a second HZ workflow may be used. In addition to formation layering, the inversion process evaluates the borehole shape and properties. The HA workflow is based on interval processing assuming locally constant formation dip (e.g., a formation where the size of interval is dependent on relative dip). On the other hand, the HZ workflow assumes that the tool is parallel to formation boundaries, and thus the inversion process is able to take into account the non-crossed boundaries that may affect the tool readings. The approach allows for lateral variation of formation properties, layer thickness and dip. However, since in HZ workflows short segments (e.g., 2 ft. long segments) are processed at the time, the interpretation is not as robust and consistent as compared to the HA interpretation. It would be beneficial to improve HA and HZ inversion-based workflows.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to well logging using gamma ray sources and detectors. A method according to the disclosure includes collecting data from the subterranean formation using a nuclear density tool, wherein the nuclear density tool is configured to collect data to form an azimuthal image. The method further includes characterizing a section of the subterranean formation comprising data and images acquired in a high angle wellbore section, a horizontal wellbore section, or a combination thereof. The method additionally includes performing a parallel inversion using apparent densities and volumetric photoelectric factor images to build a formation model, wherein the parallel inversion comprises a high angle workflow that models high angle wellbore sections and a horizontal workflow that models horizontal wellbore sections.

In another example, a downhole measurement system includes a gamma ray source configured to generate gamma rays into a subterranean formation, a detector configured to detect a radiation from the subterranean formation, and a processor. The processor is configured to collect data from the subterranean formation using the detector to form an azimuthal image. The processor is additionally configured to characterize a section of the subterranean formation comprising data and images acquired in a high angle wellbore section, a horizontal wellbore section, or a combination thereof. The processor is further configured to perform an inversion using apparent densities and volumetric photoelectric factor images to build a formation model wherein the inversion comprises extracting model boundaries.

The system is more particularly configured to carry out all the embodiments of the method as disclosed hereafter.

Moreover, non-transitory, tangible computer readable storage medium, comprising instructions is described. The instructions are configured to collect data from a subterranean formation using a detector to form azimuthal images, and to characterize a section of the subterranean formation comprising data and images acquired in a high angle wellbore section, a horizontal wellbore section, or a combination thereof. The instructions are additionally configured to perform a parallel inversion using apparent densities and volumetric photoelectric factor images to build a formation model, wherein the parallel inversion comprises a high angle workflow that models high angle wellbore sections and a horizontal workflow that models horizontal wellbore sections.

The instructions are configured to perform all the embodiments of the method as disclosed in this application.

Another method according to the disclosure relates to perform a parallel inversion using apparent densities and volumetric photoelectric factor images to build a formation model, wherein the parallel inversion comprises a horizontal workflow that models horizontal wellbore sections. The horizontal workflow comprises performing a horizontal well pre-processing workflow, wherein the pre-processing workflow comprises:

obtaining a curtain-section model from azimuthal squaring compensated density image data;

identifying points defining a formation boundary of the subterranean formation by comparing boundary true vertical depths (TVDs) and density contrast in adjacent sections of data sequentially;

filtering out hanging points;

sampling formation boundaries within a predefined interval; and building up a topological model for each of the horizontal wellbore sections by identifying geometry and zones of the formation model.

This method may also comprise other features described in this disclosure and particularly features in relation with the previous method.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
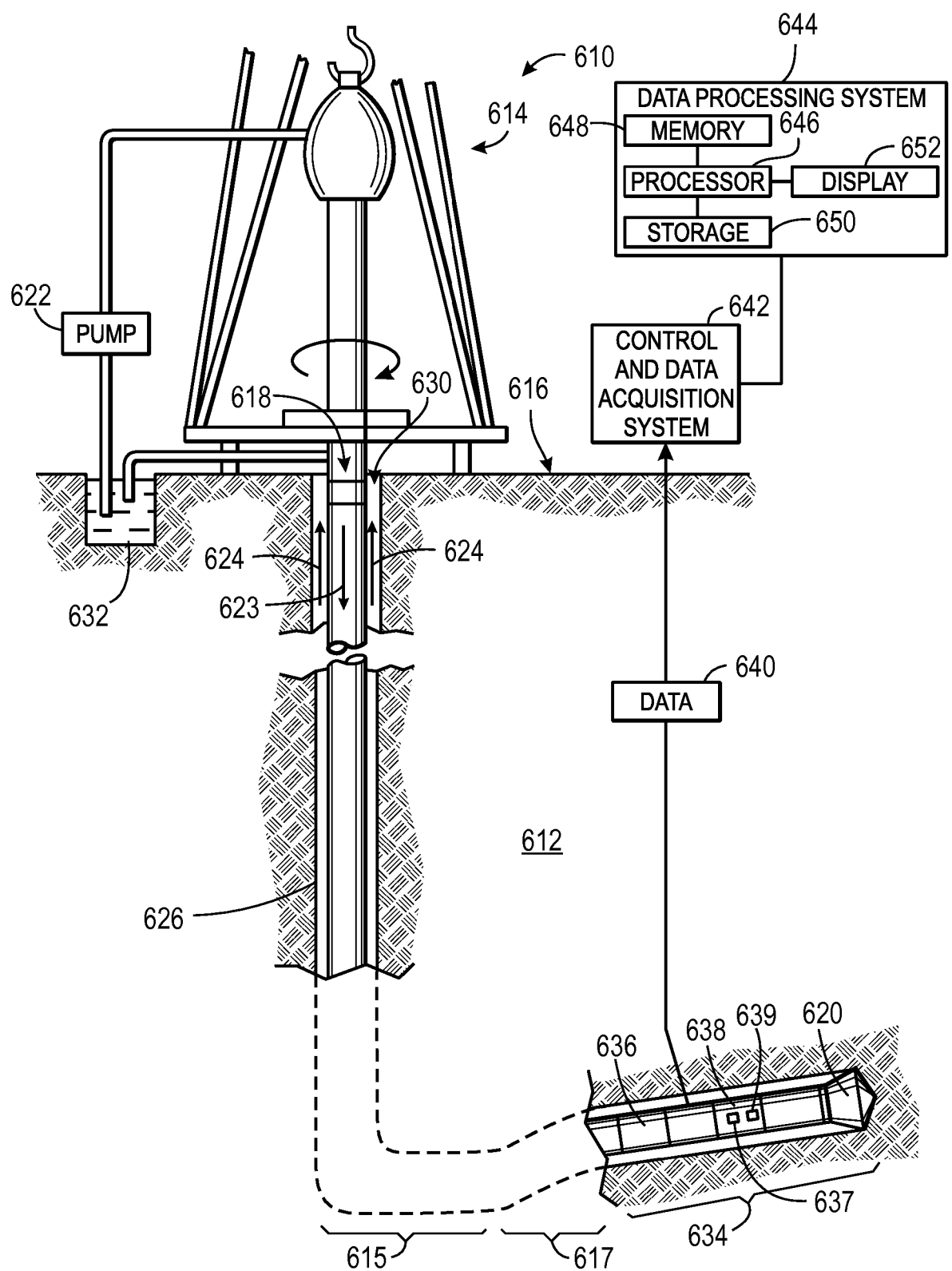
FIG. 1 illustrates and embodiment of a drilling system that may apply the techniques described herein.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques described herein include a parallelized workflow for inversion-based interpretation of nuclear density images in high-angle (HA) as well as horizontal (HZ) wells. The workflow applies interval processing and extended parameterization that may improve consistency of interpreted structure and density profiles compared to, for example, point-by-point inversion techniques. A model may be defined, as described in more detail below, and the model definition may extend beyond 1D. The model described herein is able to define formations with non-parallel boundaries, variable dip, and lateral property changes, which are functionalities useful for HZ well interpretation. That is, the boundaries may be non-parallel curves and the boundaries can start and end at any location in the interval, thus, the boundaries do not have to start from the beginning of the interval and terminate at the end of the interval. A process described herein may automatically extract model boundaries starting from azimuthal squaring followed by an "advancing-front" to construct boundary contours in a "curtain-section" plot. The parameterizations described herein also enable definitions of 2D zones that take into account internal layering and cross-bedding structures.

In a preprocessing workflow and formation boundary extraction, an image segment is chosen to be large enough to cover a complete HZ image feature, such as 'bull's eye' feature. An approximate curtain-section image is obtained after squaring the azimuthal compensated density (COMP) response within small intervals. Formation boundaries are extracted by comparing the true vertical depth (TVD) of the bed boundaries between neighbor intervals and the densities above and below each boundary. A manual adjustment may be used so that the automatic extraction is more accurate. Afterwards, the layout of the boundaries is found by comparing the center location of the boundaries in the curtain-section plane. Each formation layer between two or more boundaries is assumed to have a unique density and photoelectronic factor. If desired, the layer can be further divided into sub-layers to add more details into the formation model. The implementation of sub-layers is similar to those of main layers.

A graphical user interface may be used so that it would be easier to adjust the formation boundaries graphically. Once the boundaries are defined and the initial formation model is constructed, layer density and photoelectric factor may be found in the inversion workflow.

Inversion workflow and post-processing may include inverting layer density and other parameters by fixing the boundaries position from pre-processing. Gauss-Newton optimization with line search adaptive regularization and parameter constraints may be used, but other similar techniques (e.g., non-linear lest square solving techniques), may be used. A cost function may include a weighted $L_2$-norm (e.g., Euclidean vector norm) error between the measurements and the modeled responses over log points in each segment. The inversion workflow may include the following three activities: 1) Invert borehole average radius and mud properties using short spacing density (SS), differential density (DRHO) and apparent volumetric photoelectric factor (UAPP) channels for sectors and log points. In each segment the mud properties are assumed to be uniform and the borehole is assumed to have cylindrical geometry. 2) Invert borehole geometry with staircase or harmonic model using SS and DRHO channels for each sector and log points. Borehole geometry is defined in terms of borehole radius from tool axis to the borehole wall. For staircase geometry, the borehole radius is assumed to be piecewise constant within each sector, while harmonic expansion over tool azimuth is used in the harmonic model. 3) Invert formation layer density and photoelectric factors based on the inverted mud properties and borehole geometry using long spacing density (LS), COMP and UAPP channels for sectors and log points.

Parallelization may be used. Indeed, a serial process may be parallelized based on the segments, since the inversion for each segment is independent to the others. Grid Services Lite (GSL) parallelization scheme shows good performance for uniform segmentation. For non-uniform segmentation scheme, the parallelization provides reasonable additional speed. The GSL is a task scheduler for parallel execution of computing jobs, so any other similar scheduler may be used.

It may be useful to illustrate certain systems that apply the techniques described herein. Accordingly, FIG. 1 illustrates a drilling system 610 that includes a Logging-While-Drilling (LWD) system 611. The drilling system 610 may be used to drill a well into a geological formation 612 and obtain measurements useful to identify characteristics of the well. In the drilling system 610, a drilling rig 614 at the surface 616 may rotate a drill string 618 having a drill bit 620 at its lower end. The drill bit 620 may traverse horizontal sections 615 as well as high angle sections 617 of the formation 612. As the drill bit 620 is rotated, a drilling fluid pump 622 is used to pump drilling fluid 623, which may be referred to as "mud" or "drilling mud," downward through the center of the drill string 618 in the direction of the arrow to the drill bit 620. The drilling fluid 623, which is used to cool and lubricate the drill bit 620, exits the drill string 618 through the drill bit 620. The drilling fluid 623 then carries drill cuttings away from the bottom of a wellbore 626 as it flows back to the surface 616, as shown by the arrows through an annulus 630 between the drill string 618 and the formation 612. However, as described above, as the drilling fluid 623 flows through the annulus 630 between the drill string 618 and the formation 612, the drilling mud 623 may begin to invade and mix with the fluids stored in the formation, which may be referred to as formation fluid (e.g., natural gas or oil). At the surface 616, return drilling fluid 624 is filtered and conveyed back to a mud pit 632 for reuse.

As illustrated in FIG. 1, the lower end of the drill string 618 includes a bottom-hole assembly (BHA) 634 that may include the drill bit 620 along with various downhole tools. The downhole tools may collect a variety of information relating to the geological formation 612 and/or the state of drilling of the well. For instance, a measurement-while-drilling (MWD) tool 636 may measure certain drilling parameters, such as the temperature, pressure, orientation of the drilling tool, and so forth. Likewise, a logging-while-drilling (LWD) tool 638 may measure the physical properties of the geological formation 612, such as density, porosity, resistivity, lithology, and so forth. The MWD tool 636 and/or the LWD tool 638 may include a gamma logging tool that emits and/or detects radioactivity. For example, the MWD tool 636 and/or the LWD tool 638 may include a radiation detector 637 and a radiation generator (e.g., neutron generator) 639. In certain embodiments, the generator 639 may produce neutrons continuously (e.g., continuous mode of operations) or in pulses (e.g., pulsed mode of operations). It is to be noted that the tool 114 as described above may be included in the MWD tool 636 and/or the LWD tool 638.

The MWD tool 636 and/or the LWD tool 638 may collect a variety of data 640 that may be stored and processed in the BHA or, as illustrated in FIG. 1, may be sent to the surface for processing. The data 640 may include azimuthal images (e.g., long spacing density [LS], short spacing density [SS], compensated density [COMP], apparent volumetric photoelectric factor [UAPP], and Delta Rho differential density (DRHO) images), density data (e.g., apparent density data), volumetric photoelectric factor data, and so on. The data 640 that is collected may include counts and/or detected energies gamma rays that may contain information relating to characteristics of the geological formation 612. The data 640 may be sent via a control and data acquisition system 642 to a data processing system 644. The control and data acquisition system 642 may receive the data 640 in any suitable way. In one example, the control and data acquisition system 642 may transfer the data 640 via electrical signals pulsed through the geological formation 612 or via mud pulse telemetry using the drilling fluid 624. In another example, the data 640 may be retrieved directly from the MWD tool 636 and/or the LWD tool 638 upon return to the surface.

The data processing system 644 may include a processor 646, memory 648, storage 650, and/or a display 652. The data processing system 644 may use the data 640 to determine various properties of the well using any suitable techniques. To process the data 640, the processor 646 may execute instructions stored in the memory 648 and/or storage 650. As such, the memory 648 and/or the storage 650 of the data processing system 644 may be any suitable article of manufacture that can store the instructions. The memory 646 and/or the storage 650 may be ROM memory, random-access memory (RAM), flash memory, an optical storage medium, or a hard disk drive, to name a few examples. The display 652 may be any suitable electronic display that can display the logs and/or other information relating to properties of the well as measured by the MWD tool 636 and/or the LWD tool 638. It should be appreciated that, although the data processing system 644 is shown by way of example as being located at the surface, the data processing system 644 may be located in the MWD tool 636 and/or the LWD tool 638. In such embodiments, some of the data 640 may be processed and stored downhole, while some of the data 640 may be sent to the surface in real time. This may be the case particularly in LWD, where a limited amount of the data 640 may be transmitted to the surface during drilling or reaming operations.

Figure 2:
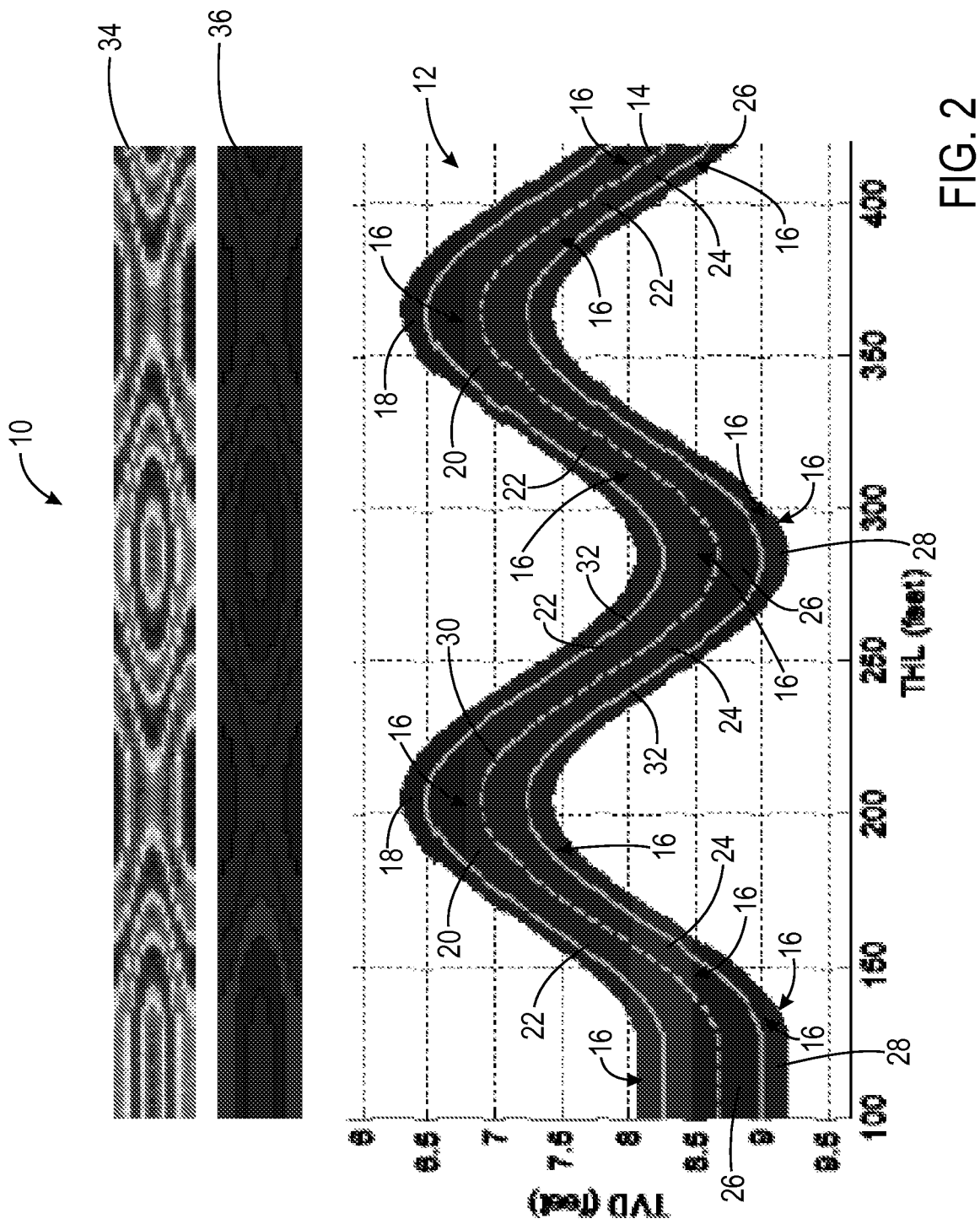
FIG. 2 is a diagram of an embodiment of a final formation model that may be derived using inversion workflow techniques.

Turning now to FIG. 2, the figure is a chart view 10 of an embodiment of a proposed formation model 12 for HZ wells in a curtain cross-section plane 14. The model 12 is described by formation boundaries 16 (solid lines) and the topology of formation layers. There are six formation layers 18, 20, 22, 24, 26, 28 in which the third layer is further divided into three sub-layers. A dashed line 30 is the tool trajectory and solid lines 32 show the borehole geometry. FIG. 2 additionally depicts a HZ inversion of noisy synthetic data. From top to bottom: a measured COMP image 34, final borehole-corrected image 36, and final formation model 12 in curtain-section plane 14.

Figure 3:
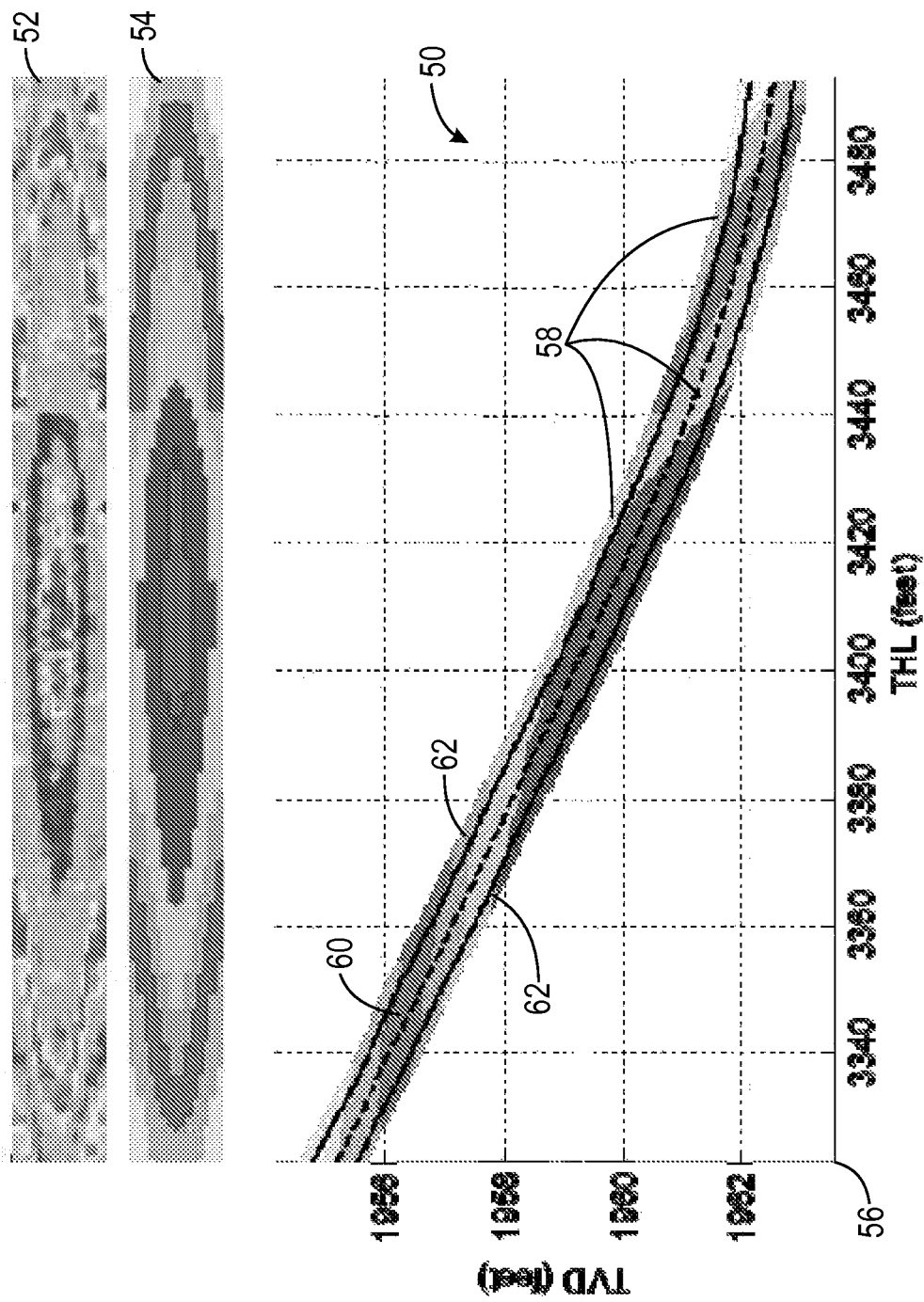
FIG. 3 is a diagram of an embodiment of a second final formation model that may be derived using inversion workflow techniques.

FIG. 3 depicts an embodiment of a chart or curtain-section model 50 showing results of a HZ inversion on field data. The figure also shows, from top to bottom, a measured COMP image 52, a final borehole-corrected image 54, and the final visual formation model 50 in curtain-section plane 56, showing various layers 58 (e.g., density layers). The black curves represent trajectory 60 (dashed line) and borehole geometry 62 (solid lines). The techniques described herein include an inversion-based workflow for interpretation of nuclear density images (e.g., images 34, 36, 52, 54) in HZ wells.

The method, as described in more detail below applies interval processing and extended parameterization to advantageously include non-parallel and curved boundaries as shown in the curtain-section plot 56. Parallelized workflows may include sliding window processing to allow lateral property discontinuity. Workflows may also include an automatic extraction of model 50 boundaries starting from azimuthal squaring followed by an "advancing-front" to construct the model 50 boundary contours in the curtain-section plot 56. The parameterization also allows definition of 2D zones to take into account internal layering and cross-bedding structures. The model 50 definition may be beyond 1D and is able to define formation with non-parallel boundaries, variable dip and lateral property changes. The boundaries may be non-parallel curves and the boundaries can start and end at any location in the interval, thus, the boundaries do not have to start from the beginning of the interval and terminate at the end of the interval. Indeed, inversion parameterization may include 2D and 3D formation information (cross-bedding with changes in layer that are not conforming to original layering).

Figure 4:
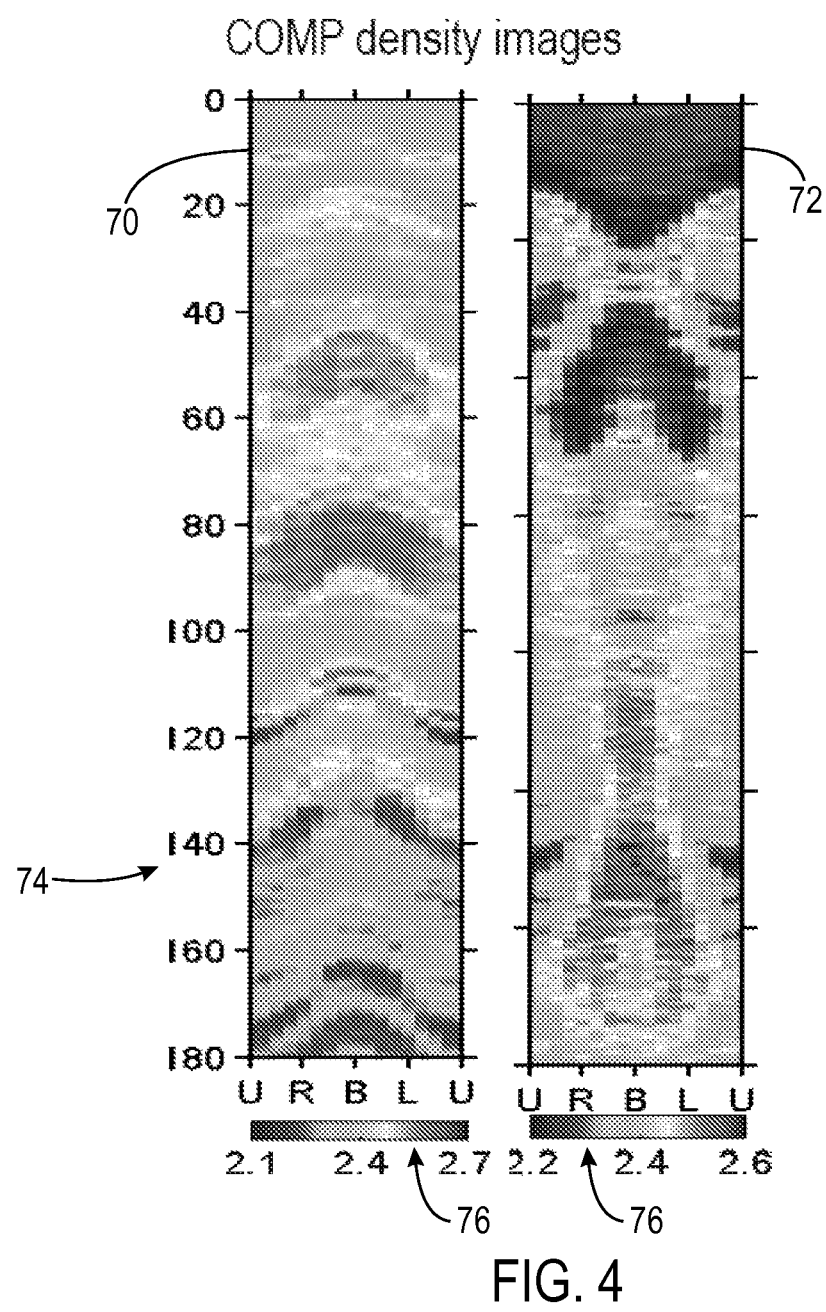
FIG. 4 is a diagram of embodiments of azimuthal compensated density images that may be processed using the techniques described herein.

As shown in FIG. 4, a variety of images 70, 72 derived from formation analysis techniques, such as nuclear gamma-gamma density measurement techniques, may be processed to build the 2D and 3D formation information. More specifically, images 70, 72 may include azimuthal compensated density images 70, 72 that may include an ordinal axis 74 with measurements in feet and an abscissa axis 76 with measurements representative of formation density. It is to be noted that the axes 74, 76 may have different scales for each image 70, 72. The images 70, 72 may be processed via inversion workflows, as described in more detail below, to derive the formation's geophysics. Inversion workflows may include HA wells as well as HZ wells, and may be parallelized for increased modeling speed. HA and HZ sections may be integrated, further increasing accuracy. That is, HA and HZ image sections may be analyzed together to derive an improved model of the formation undergoing analysis. In certain embodiments, nuclear density fast modeling may be applied to produce synthetic images in corresponding formation 70, 72, as shown in FIG. 5, to enable a faster and more accurate modeling of the formation being analyzed.

Figure 5:
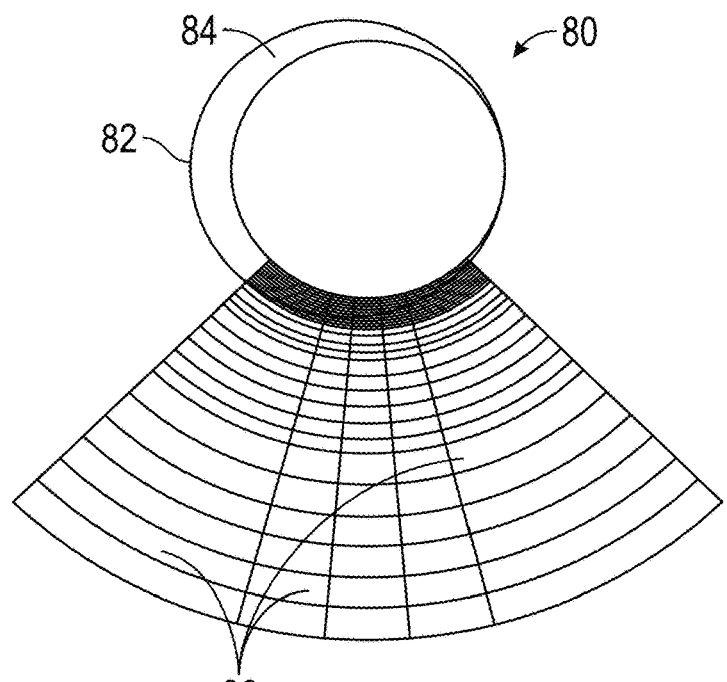
FIG. 5 depicts an embodiment of a r-θ grid image that may be derived using the techniques described herein.
Figure 6:
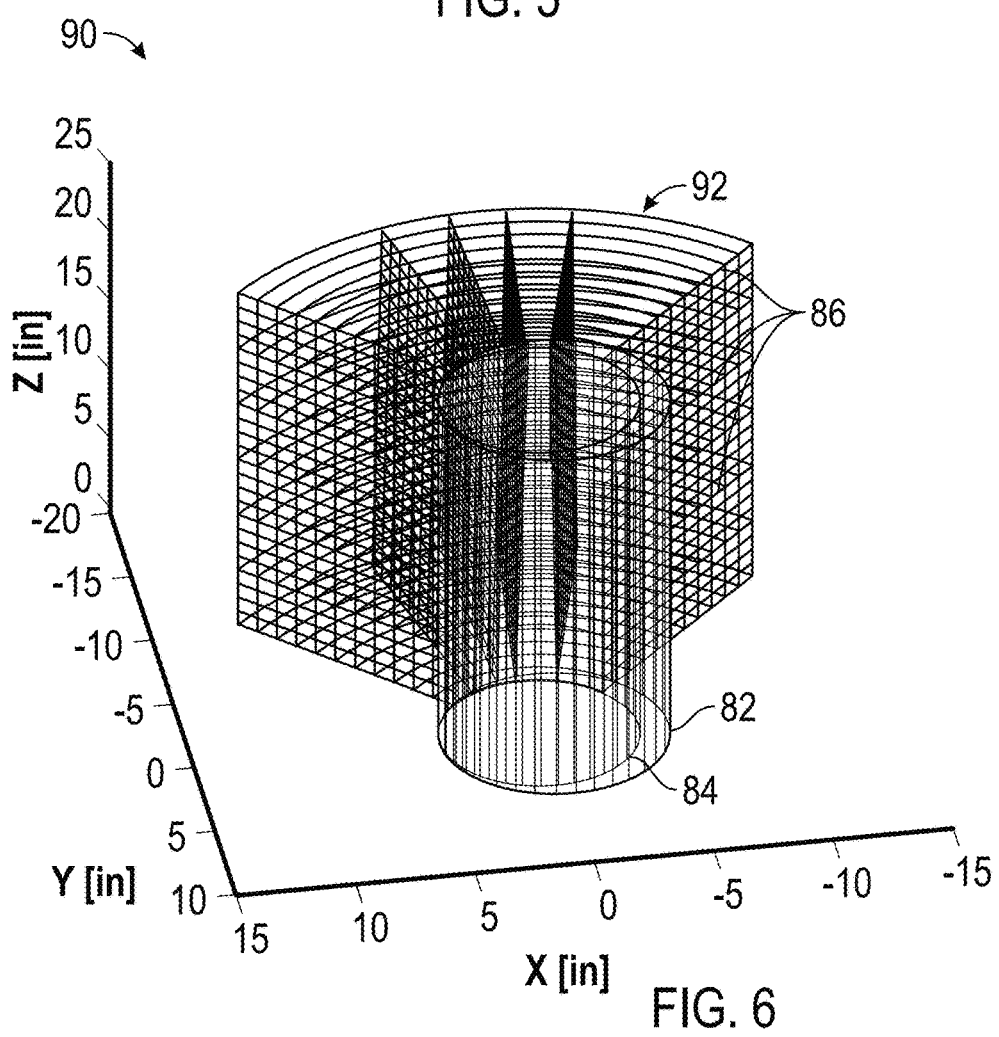
FIG. 6 is perspective view of an embodiment of a 3D grid extending from approximately −45° to 45° that may be based on the images of FIG. 5.

More specifically, FIG. 5 depicts an embodiment of an r-θ grid image 80 for θ approximately between approximately −45° and +45° that may be derived for fast-forward modeling. The depicted image shows a circle 82 representative of a borehole and a circle 84 representative of nuclear gamma-gamma density measurement tool, such as an Eco-scope™ tool available from Schlumberger Limited, of Houston, Tex. The tool 84 may provide for a series of imaging windows 86 representative of a formation density. In one embodiment the windows 86 may be stacked, as shown in FIG. 6, to derive a three-dimensional (3D) view 90 representative of the formation being analyzed. Also shown in 3D are the borehole 82 and the measurement path 84 taken by the measurement tool. The view 90 includes a 3D grid 92 of the segments 86 derived, for example, by stacking windows 86 on top of each other. A series of sensitivity functions may be applied to the 3D grid 92 to pre-compute measurement responses for density and photoelectric factor properties defined on the same grid 92. In one embodiment, 5 cells may be disposed in the azimuthal direction, with grid nodes located at ±5°, ±15° and ±45° with respect to the detector face normal. In other embodiments, less than or more than 5 cells may be used, with grid node angles correlative to the number of cells chosen.

A fast-forward model may use the pre-computed first and second order sensitivity functions to compute responses for log points and sectors, such as linear approximation and 2D flux sensitivity functions. By using the pre-computed functions, the forward modeling may achieve speeds over one million times faster than Monte Carlo N-Particle (MCNP) simulations, thus providing for real-time or near real-time view of the formation. Further speed improvements may be achieved via parallelization, as described in more detail below.

Figure 7:
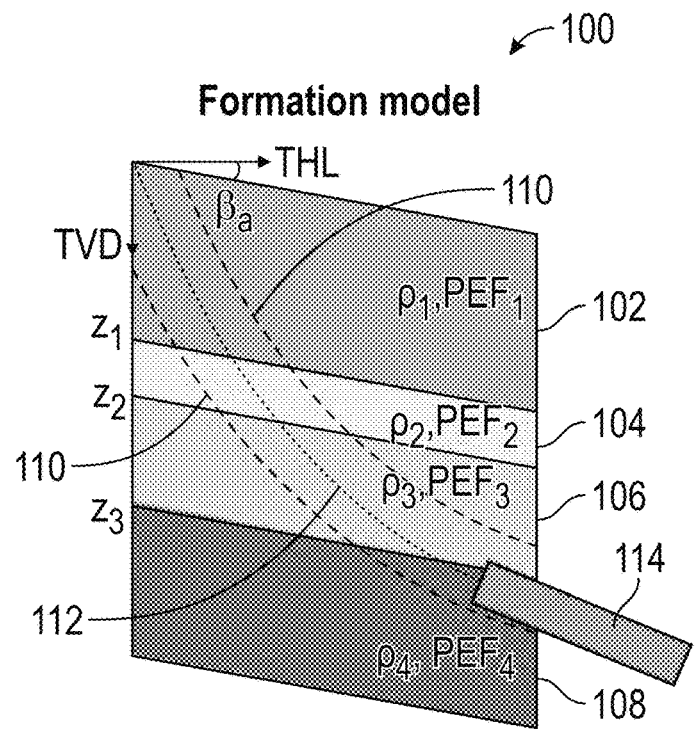
FIG. 7 is a schematic drawing of an embodiment of a high-angle (HA) well model parameterization.

Turning now to FIG. 7, is a schematic drawing of an embodiment of a high-angle (HA) formation model parameterization 100 at true vertical depth (TVD) and true horizontal length (THL), including set of dipping layers 102, 104, 106, 108 with trajectory of varying inclination, strictly up-section or down-section. Borehole geometry 110 is represented with dashed lines. The HA well model 100 may assume that a trajectory 112 can be discretized into segments such that the formation in each segment is 1D layering with constant dip and azimuth. The trajectory azimuth is assumed to be constant in each segment, and the trajectory inclination is assumed to be "down-section", with layers crossed at relative dip less than 90°, or "up-section", when layers are crossed at relative dip greater than 90°. FIG. 7 additionally shows the formation for a typical down-section segment when viewed in the "curtain-section" plane, e.g., a vertical surface defined by the trajectory.

Free parameters for the segment are an apparent formation dip α, TVD location z of each boundary layer, layer densities ρ, and layer photoelectric factors PEF. The segmented nature of the HA model 100 allows the model 100 to capture variations in dip and layer properties along the trajectory of a density measurement tool 114. The high-angle parameterization may degrade for relative dip close to 90°, where a separate approach, such as a horizontal approach, may be used. The HA modeling may be applied to images with sinusoids, such that segment size is approximately equal to sinusoid amplitude.

Figure 8:
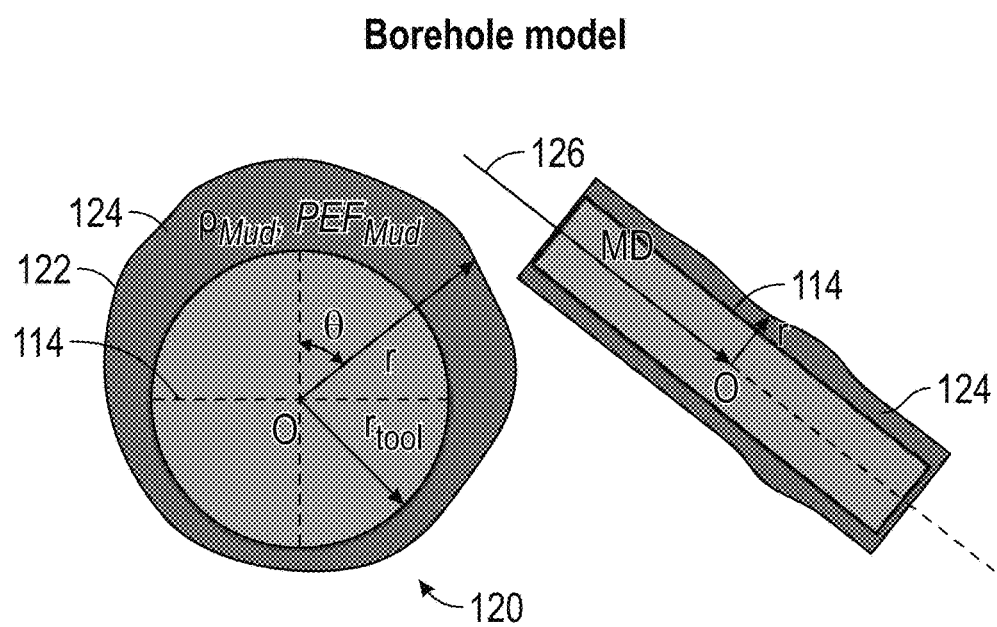
FIG. 8 is a schematic drawing of an embodiment of a borehole model parameterization.

FIG. 8 depicts an embodiment of a borehole model parameterization 120 having a borehole geometry 122 and homogeneous mud 124 properties. The density measurement tool 114 is also depicted, with an arrow 126 (e.g., $r_{tool}$ arrow) representative of measured depth (MD). The mud 124 properties, $\rho_{mud}$ and $PEF_{mud}$, may be defined in the same trajectory segments used for the formation model 100, and may be assumed to be uniform in each segment. The geometry of the borehole is defined in terms of the radial distance from the tool axis to the borehole wall, denoted by r, where θ is the tool 114 azimuth. Cylindrical geometry algorithms, 3D staircase geometry algorithms, and/or 3D harmonic geometry algorithms may be applied to images 86 to derive the geometry 122. Accordingly, an inversion-based approach and a caliper-based approach may be used, which may be more robust and accurate by modeling the true geometry 122 as well as a layered background, more effectively decoupling a borehole effect from a boundary effect.

Figure 9:
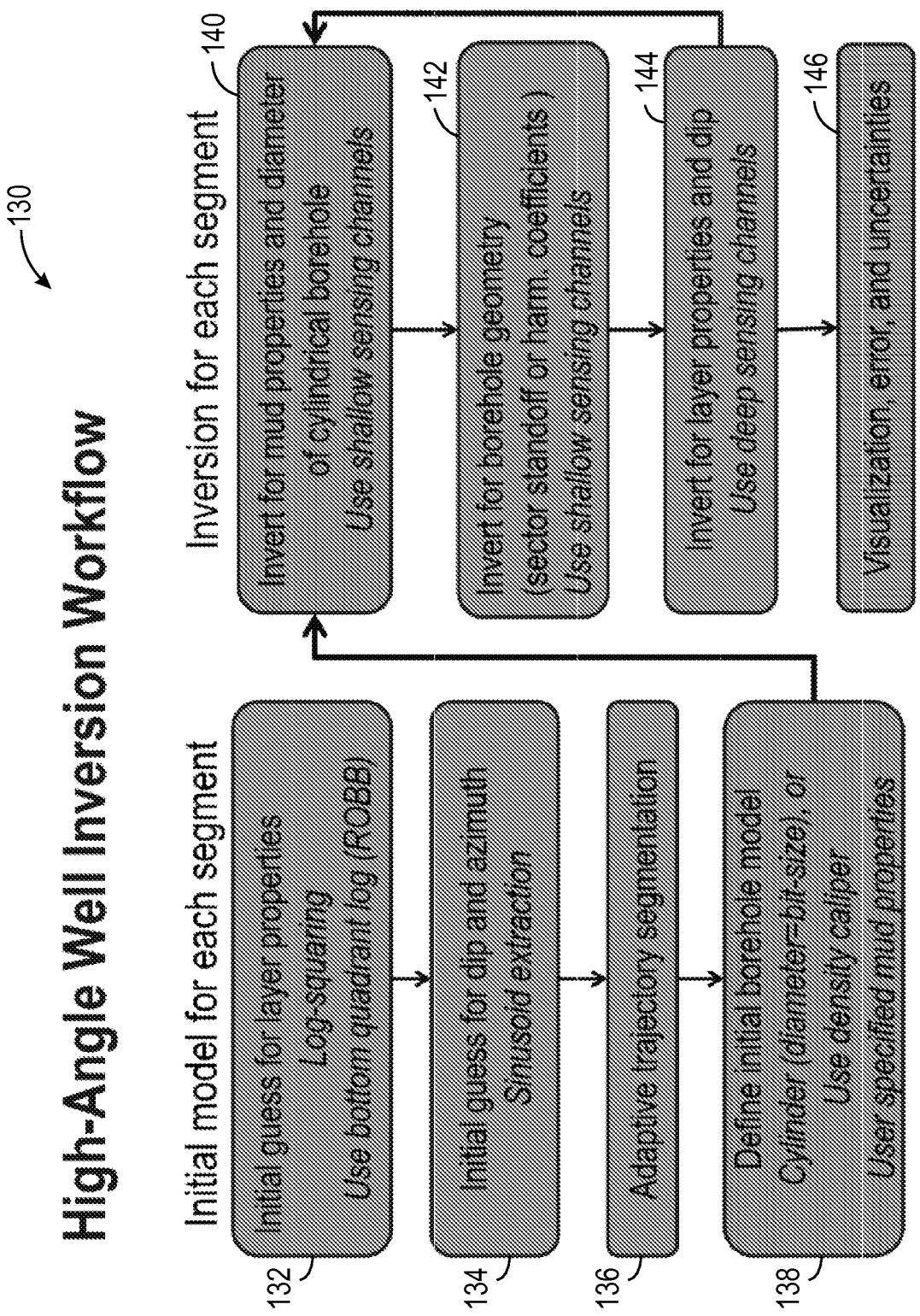
FIG. 9 is a flowchart depicting an embodiment of a process 130 suitable for executing an HA well inversion workflow.

FIG. 9 is a flowchart of an embodiment of a workflow or process 130 suitable for executing a HA well inversion workflow to derive, for example, the formation model 100 shown in FIG. 7. The process 130 may be implemented as computer instructions executable via a processor of the tool 114 and may be stored in a memory of the tool 114, and/or may be stored in memory 648 to be executed via processor 646, or in other external systems to be stored and processed by the external systems. In the depicted embodiment, the process 130 may, for example, analyze nuclear gamma-gamma density data acquired via the tool 114 beginning at a bottom quadrant density log (ROBB) and applying a log squaring approach (block 132). ROBB may be particularly useful because standoff (e.g., distance between tool 114 and borehole) may be minimized. The log squaring approach may yield an initial guess for layer properties, e.g., $\rho_i$, $PEF_i$. The process 130 may then derive an initial guess for dip and azimuth of the formation (block 134), for example, via sinusoid extraction described in more detail below. Adaptive trajectory segmentation (block 136) may subdivide images into sub-domains or sub-images for further processing based on, for example, the dip derivations.

An initial borehole model (e.g., model 82) may be defined (block 138) by deriving a cylinder based on a diameter of a bit size used to drill through the formation. The borehole model may be further approximated via a density caliper tool data, and user specified mud properties (e.g., mud density and type of mud used during drilling) may be additionally used during the definition of the borehole model (block 138). Each segment 86 may then be inverted (block 140) for mud properties. That is, available mud property methods may be reproduced numerically via forward models that incorporate specific measurement response functions for numerical simulation of LWD measurements (block 140). Shallow depth data, e.g., shallow sensing channels included in the tool 114, may provide more accuracy as compared deep sensing channels.

Inversion may also be used to derive borehole geometry (block 140). Shallow sensing channels may also be used, and sector standoff or harmonic coefficient processing may be used during the inversion (block 142) derivation of the borehole geometry. Likewise, inversion may also be used to derive layer properties, boundary positions, and dip (block 144). However, deep sensing channels may provide more accuracy to derive the layer properties, boundary positions, and dip (block 144). The process 130 may then provide for a visualization of the inverted data, and an error and uncertainty calculation (block 146). It may be beneficial to illustrate imaging derived by applying the process 130.

Figure 10:
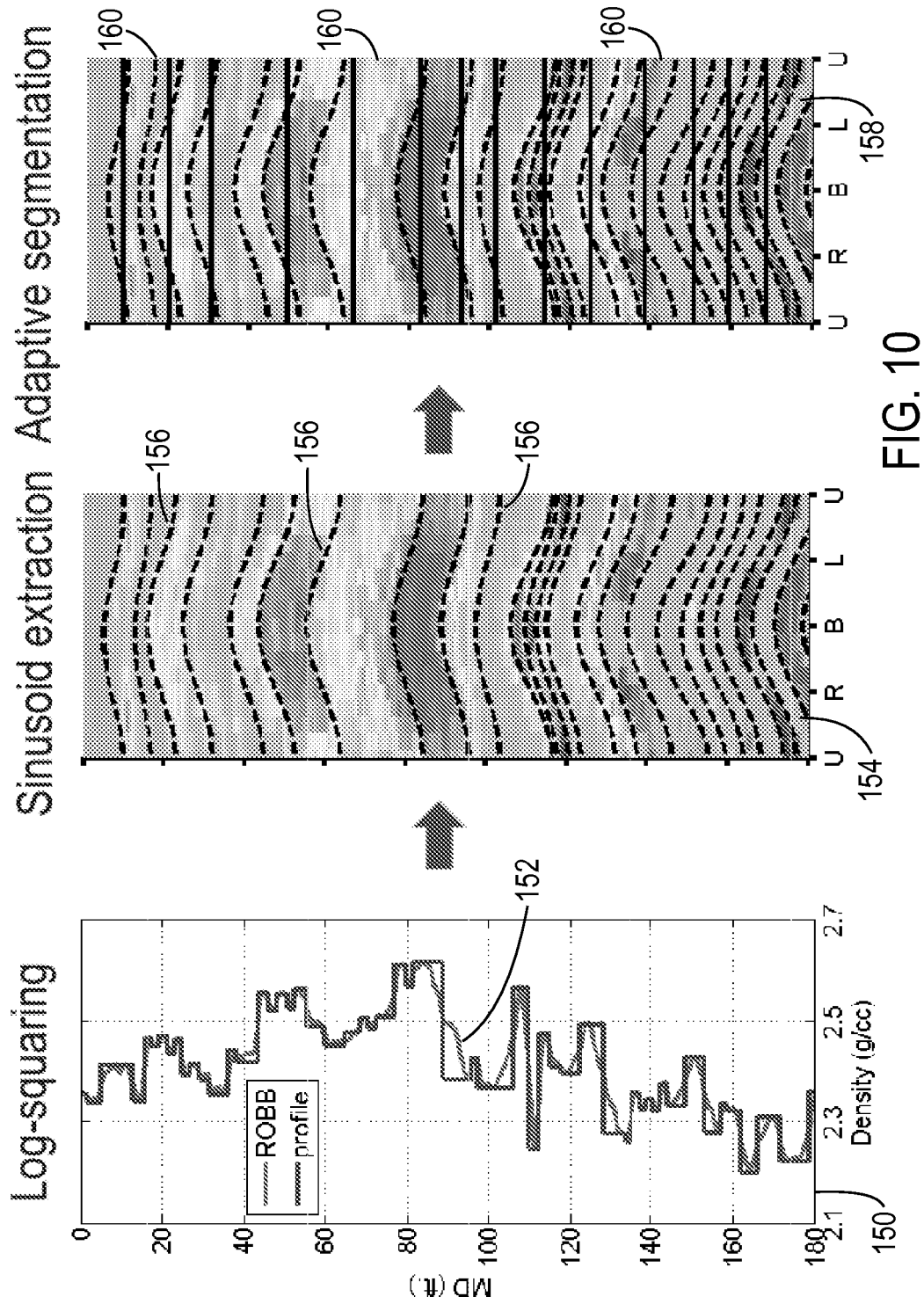
FIG. 10 depicts an embodiment of a log-squaring chart (left figure), sinusoids that may be obtained from sinusoid extraction process (middle figure), and interval segmentation (right figure)

Accordingly, FIG. 10 shows a squared log chart 150 including a ROBB bottom quadrant data portion 152 obtained at block 132. The chart 150 may be used to obtain images suitable for inversion. More specifically, a log-squaring algorithm is applied to the ROBB log 152. Image 154 may be an original image that may include sinusoids 156, and the sinusoids 156 may then be extracted (as described at block 134), using, for example, image processing techniques that identify curved structures in images. An amplitude and a phase for each of the sinusoids 156 may correspond to relative dip and relative azimuth of a layer boundary.

Adaptive segmentation (as described at block 136) may then be used to divide the image 154 into an image 158 subdivided into multiple segments 160. Adaptive segmentation may change segment 160 sizes so that at least one sinusoid 156 is inside of each segment 160. The ROBB log 152 may then be combined with segments 160 during analysis. Using the process 130 as shown, high angles of up to 88° may be more accurately imaged. While angles between 88° and 92° may also be imaged via the process 130, it may be preferable to apply a horizontal well approach (HZ) described in more detail with respect to FIG. 12 below. The segments 160 may then be inverted to derive a variety of parameters as depicted in FIG. 11.

Figure 11:
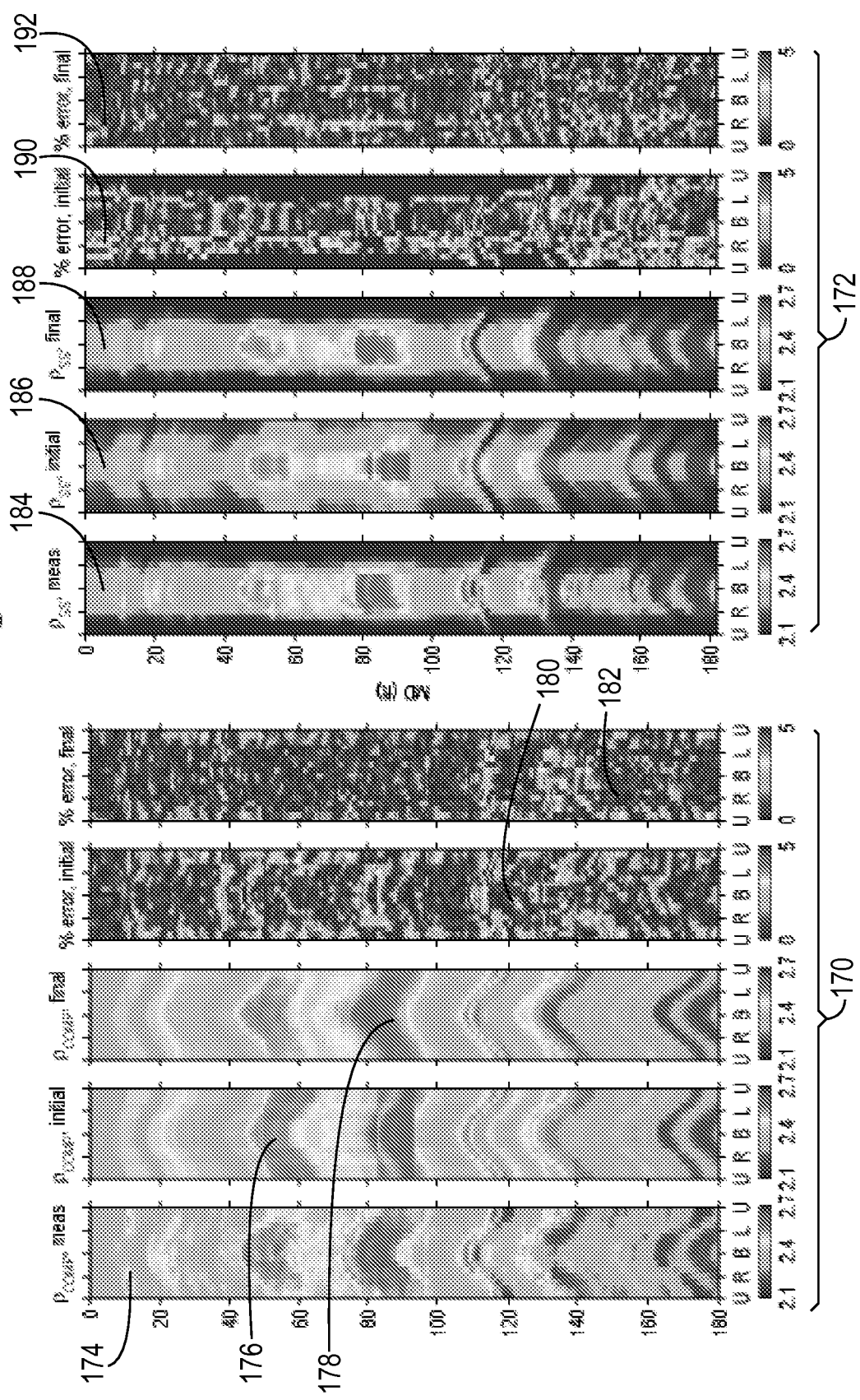
FIG. 11 depicts embodiments of images that may be processed via HA inversion, and results obtained before and after processing.

More specifically, FIG. 11 depicts embodiments of a first set of COMP images 170 and a second set of short spacing density (SS) images 172 to illustrate HA derivation of density parameters ρ based on COMP channels (e.g., $\rho_{comp}$-based parameters) and SS channels (e.g., $\rho_{ss}$-based parameters). As illustrated, image 174 may be derived by using measurements taken via the tool 114 (e.g., nuclear gamma-gamma measurement tool) using COMP channels. An initial guess image 176 may then be derived (as described at block 132). As mentioned above, squared log of ROBB data 152 and sinusoids 156 may be used to derive the initial guess image 176. For example, squared log 152 and sinusoids 156 are used to derive the initial model (100 and 120), then the initial tool responses, 176 and 186, are calculated using density fast-forward model, e.g., 90. HA inversion may then be applied to certain models, e.g., 100 and/or 120, resulting in a final COMP image 178 (as obtained at block 146). A fast-forward model may use pre-computed first and second order sensitivity functions to compute responses for log points and sectors, such as linear approximation and 2D flux sensitivity functions during inversion. That is the fast-forward model may be used to compute initial and final tool response. Image 180 shows a relative error for the initial guess image 176 compared to the measurement image 174, while image 182 shows a relative error for the final COMP image 178 compared to the measurement image 174. As shown, image 182 is less noisy when compared to image

180, depicting how inversion may provide for a more efficient and accurate measure of density properties $\rho_{comp}$.

Also shown is a measured image 184 measured using SS channels. An initial guess image 186 (as described at block 132) may then be derived. Inversion may then be applied to certain models e.g., 100, 120, resulting in a final SS image 186 (as obtained at block 146). A fast-forward model may use pre-computed first and second order sensitivity functions to compute responses for log points and sectors, such as linear approximation and 2D flux sensitivity functions during inversion. Image 190 shows a relative error for the initial guess image 186 compared to the measurement image 184, while image 192 shows a relative error for the final SS image 188 compared to the measurement image 184. As shown, image 192 is less noisy when compared to image 190, depicting how HA inversion may provide for a more efficient and accurate measure of density properties $\rho_{ss}$.

Figure 12:
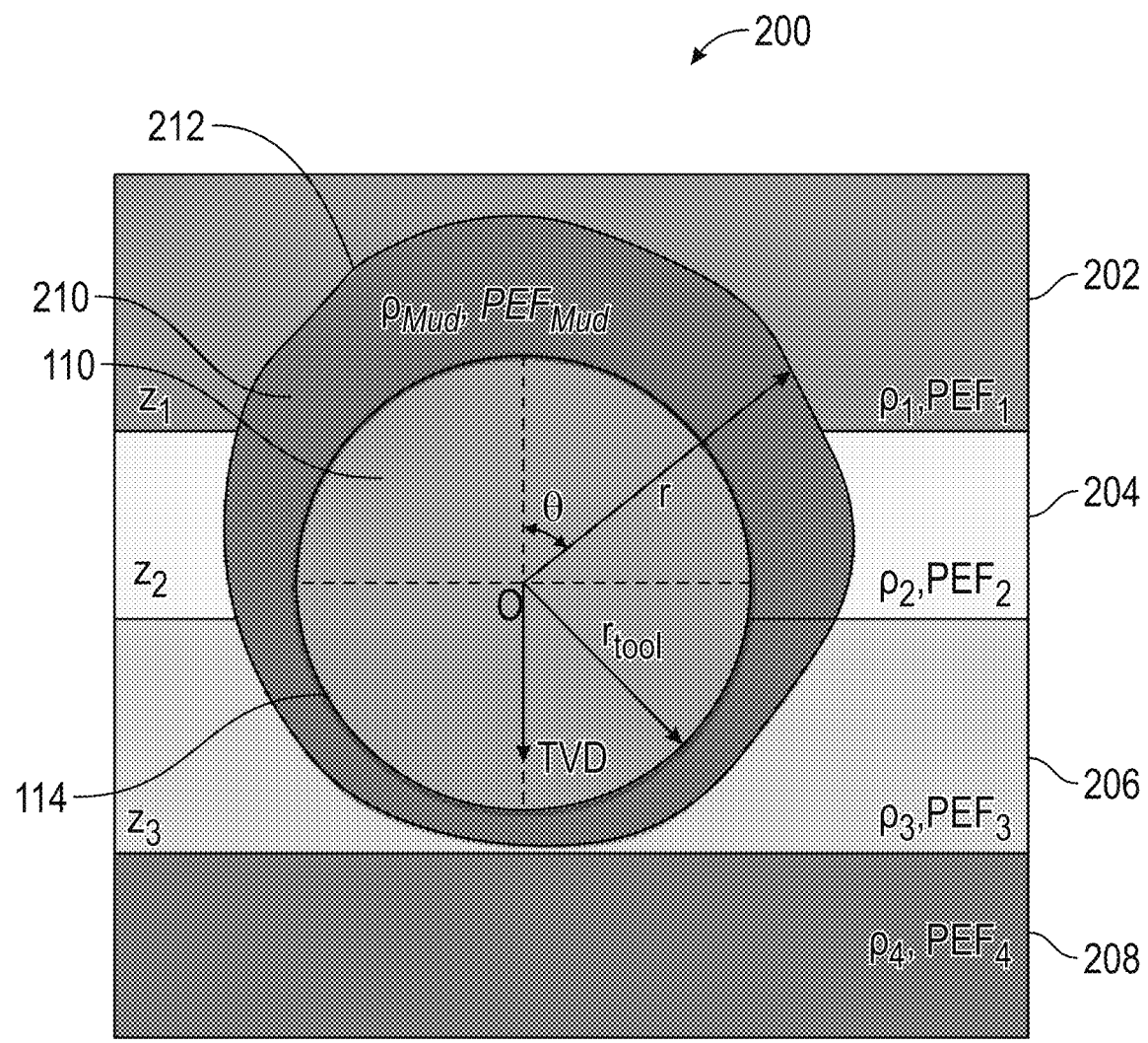
FIG. 12 illustrates an embodiment of a borehole model parameterization for horizontal (HZ) sections.

Turning now to FIG. 12, the figure depicts an embodiment of a borehole model parameterization 200 useful for modeling horizontal (HZ) wells. In the depicted embodiment, the HZ borehole model parameterization 200 includes layers 202, 204, 206, and 208 with a trajectory of substantially horizontal inclination. Indeed, the HZ borehole model parameterization 200 may be particularly useful at angles between 88° and 92°. Mud 210 properties, $\rho_{mud}$ and $PEF_{mud}$, may be defined in the same trajectory segments used for the formation model, and are assumed to be uniform in each segment. A geometry 212 of the borehole is defined in terms of the radial distance from the tool axis to the borehole wall, denoted by r, where θ is the tool azimuth and $r_{tool}$ is the tool 114 radius. The HZ well model 200 also assumes discrete segments such that the formation in each segment is 1D layering with dip and azimuth, and such that the trajectory azimuth is constant in each segment. However, the HZ well model 200 constrains the layer boundaries in each segment to be parallel to the trajectory, e.g., constant relative dip 90°. Shorter segments would be used to account for the more horizontal tool orientation and to better capture lateral changes in the formation. The HZ borehole model parameterization 200 may also be particularly applicable to images with "bull's eye", "reverse bull's eye", "railroad tracks", and similar features.

Figure 13:
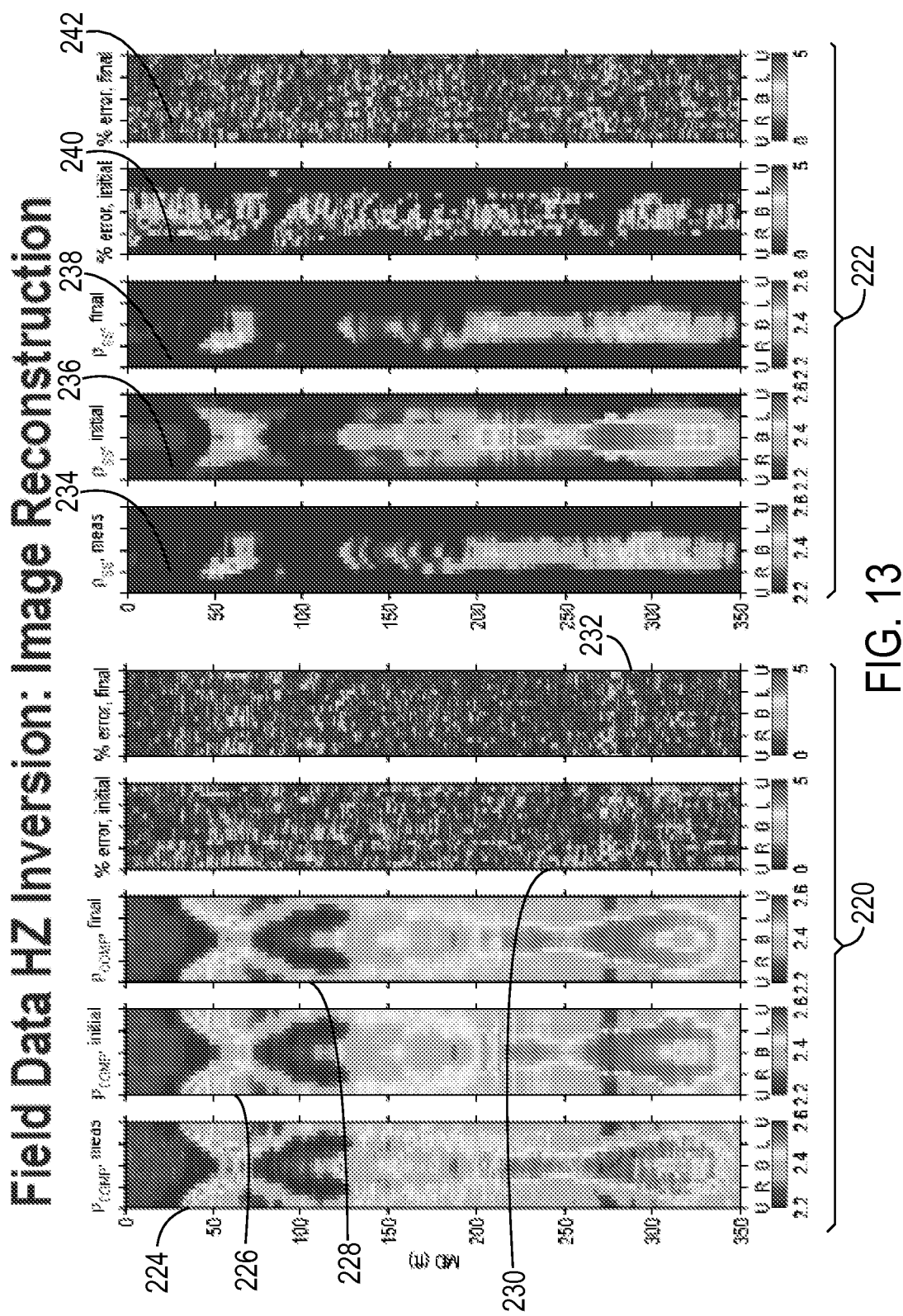
FIG. 13 depicts embodiments of images that may be processed via horizontal (HZ) inversion, and results obtained before and after processing.

FIG. 13 depicts embodiments of a first set of COMP images 220 and a second set of short spacing density (SS) images 222 to illustrate HZ derivation of density parameters ρ based on COMP channels (e.g., $\rho_{comp}$-based parameters) and SS channels (e.g., $\rho_{ss}$-based parameters). As illustrated, image 224 may be derived by using measurements taken via the tool 114 (e.g., nuclear gamma-gamma measurement tool) using COMP channels. An initial guess image 226 may then be derived. As mentioned above, log squaring of ROBB data may be used to derive the initial guess image 226. HZ inversion may then be applied to certain models, e.g., 110, 120, resulting in a final COMP image 228. A fast-forward model may use pre-computed first and second order sensitivity functions to compute responses for log points and sectors, such as linear approximation and 2D flux sensitivity functions during inversion. Image 230 shows a percent error for the initial guess image 226, while image 232 shows a percent error for the final COMP image 228. As shown, image 232 is less noisy when compared to image 230, depicting how inversion may provide for a more efficient and accurate measure of density properties $\rho_{comp}$.

Also shown is an initial measured image 234 measured using SS channels. Log squaring of ROBB data may additionally be used to derive an initial guess image 236. HZ inversion may then be applied to certain model types, e.g., 100, 120, resulting in a final SS image 238. A fast-forward model may use pre-computed first and second order sensitivity functions to compute responses for log points and sectors, such as linear approximation and 2D flux sensitivity functions during inversion. Image 240 shows a percent error for the initial guess image 236, while image 242 shows a percent error for the final SS image 238. As shown, image 242 is less noisy when compared to image 240, depicting how HZ inversion may provide for a more efficient and accurate measure of density properties $\rho_{ss}$.

Figure 14:
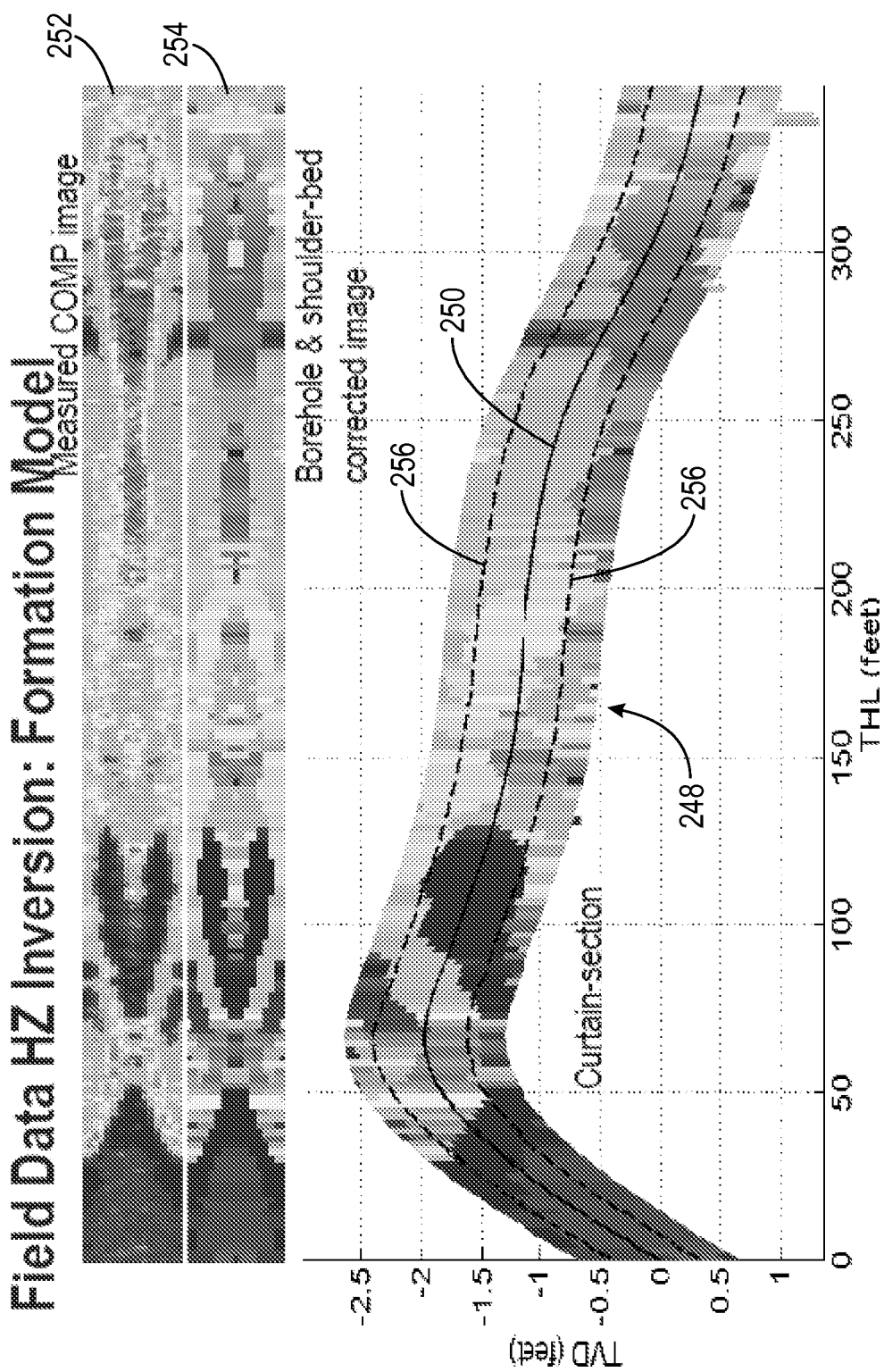
FIG. 14 depicts an embodiment of a curtain-section model obtainable via HZ inversion.

HZ inversion workflows (e.g., for relative dip between 88°-92°) may take into account non-crossed layers and may enable building a 2D curtain-section model 248 as superposition of 1D formation models defined in short segments (e.g., approximately between 1 and 3 ft) along the tool 114 trajectory 250, with layer boundaries in each segment oriented parallel to the trajectory 250, as shown in FIG. 14. More specifically, FIG. 14 depicts an embodiment of the 2D curtain-section model 248 that may have been derived, for example, via images 252, 254. Image 252 is an initially acquired image using COMP channels, while image 254 is a final image that includes borehole and shoulder-bed corrections. It is to be noted that in the depicted embodiment, the images 252, 254 include THL in excess of 300 feet while TVD varies from horizontal by less than 3 feet. Indeed, longer sections of formations, including longer sections with small horizontal variations, may be more accurately modeled with the techniques described herein. The 2D curtain-section model 248 may then be derived via superposition of small segments. FIG. 14 additionally shows a borehole geometry 256 in the 2D curtain plane.

Figure 15:
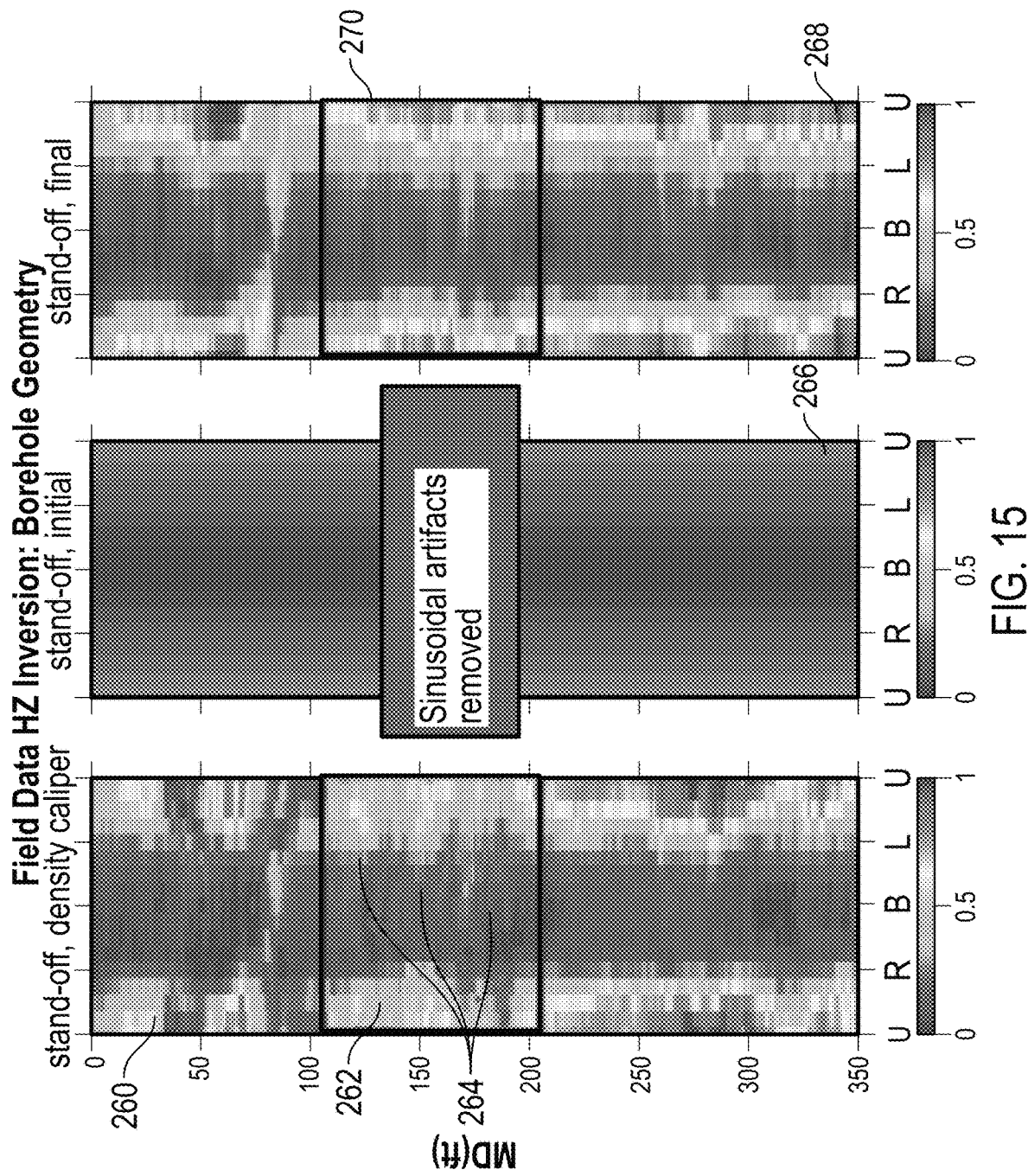
FIG. 15 depicts embodiments of images that may be applied to obtain a final borehole geometry image.

Certain imaging, as depicted in FIG. 15, may be used to more accurately derive borehole geometry and stand-off. Because the techniques described herein do not assume a homogeneous formation but rather a variant formation, borehole effects may be decoupled from a final image. For example, image 260 may be an image captured via a density caliper tool. A section 262 may include sinusoidal artifacts 264, whose locations correlate with layers in an initial image 266 (e.g., COMP image). As shown, the sinusoids are not present in the initial image 266. Accordingly, a final image 268 shows a more accurate borehole geometry, for example, in section 270, and other sections.

Figure 16:
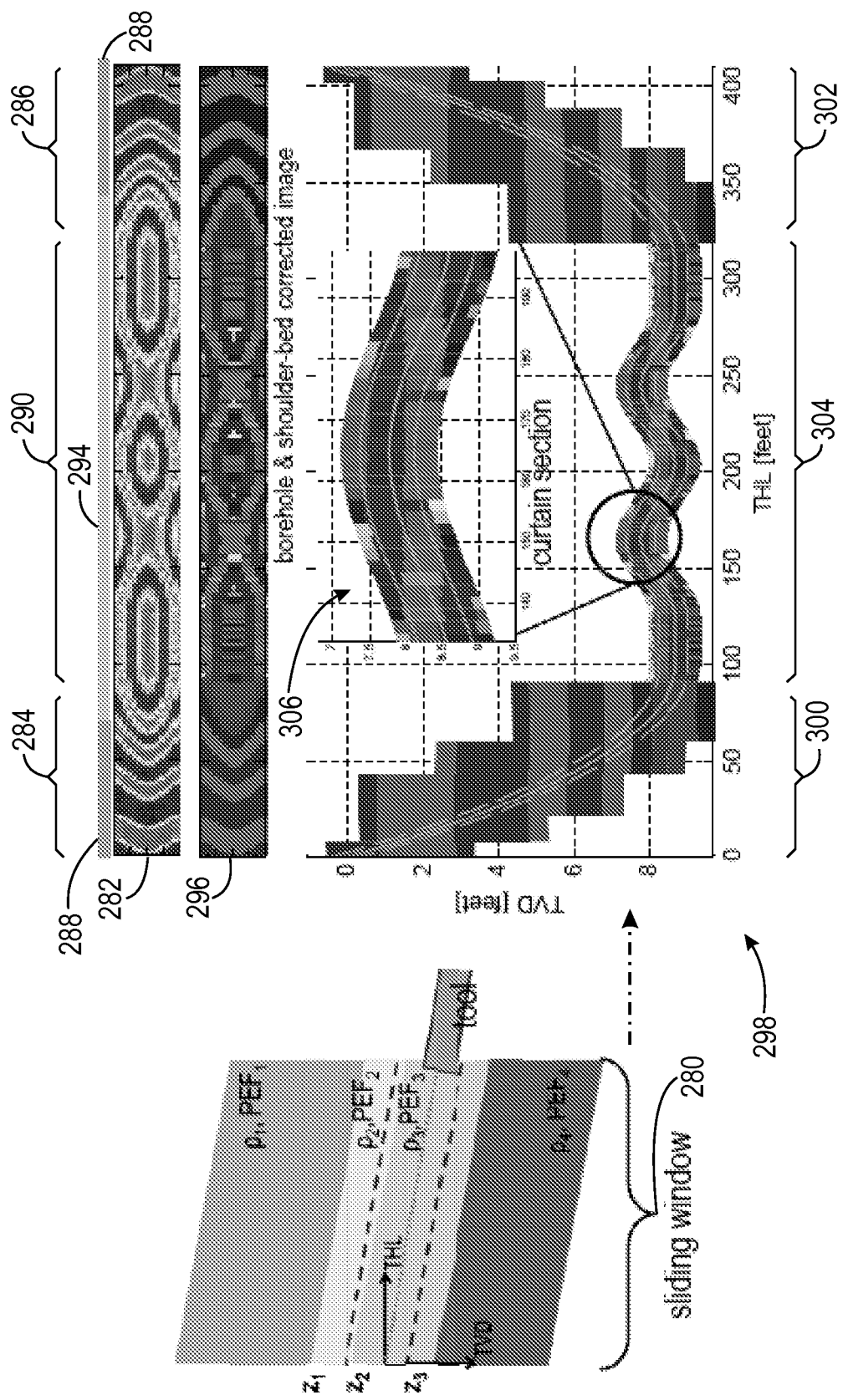
FIG. 16 depicts a curtain-section model that may be obtained by combining HZ and HA images.

HA and HZ workflows may be integrated, for example, as shown in FIG. 16. A sliding window approach may be used, where a sliding window 280 may move or otherwise "slide" through sections of an image to analyze the image sections. In the depicted embodiment, the HA workflow may be used to analyze a COMP image 282 at sections that clearly show sinusoids, such as sections 284 and 286. A certain color, on the greyscale bar above, such as dark color 288 here, may be indicative of sinusoids, thus providing for identification of sinusoids based on color. These portions may be analyzed with the HA workflow. A middle portion 290 of the image 282 may not include many, if any sinusoids, and may include a preponderance of another color, such fair color 294 here. Accordingly, the middle portion 290 may be analyzed via the HZ workflow with smaller segments. A resultant borehole and shoulder-bed corrected image 296 may then include more accurate formation density properties and borehole geometries. A curtain-section model 298 may be derived from the borehole and shoulder-bed corrected image 296. As shown, sections 300 and 302 may have been derived via the HA workflow, while middle portion 304 may have been derived via the HZ worflow. These sections 300, 302 on one side and 304 on the other side are processed separately with a different workflow.

FIG. 16 also depicts in zoom detail a section 306. The section 306 may show certain discontinuities because of the HZ workflow. To improve the HZ workflow used to derive portion 304, certain techniques may be applied as follows. For speed improvements, Grid Services Lite (GSL) or other parallelization may be used to parallelize the previous serial inversion code. Parallelization may thus split inversion into multiple smaller workflows. Log squaring may be applied to true stratigraphic thickness (TST) space to improve accuracy. Inversion of bed locations may be done in measured depth (MD), instead of thickness in TVD. Sliding windows 280 may be adjusted, for example by increasing or decreasing window size, by overlapping windows 280 with lesser or greater overlap distances, and so on. Adjustments may be made based on inclination angle of the tool 114, sinusoids, observed boundaries, and so on. For example, smaller windows 280 and/or greater overlap may be used to observe certain formation features in more detail. In certain embodiments, layers may be kept consistent along tool 114 trajectory, thus removing inconsistencies.

The handling of transitions between neighboring density zones may also be improved. For example, a slope may be derived between density zones and used to insert a transition density layer if the slope exceeds a certain amount. Weighting may also be applied along MD. For example, data near or on a middle region of a layer may be given more weight as compared to data near boundary edges. Edge detection may be applied to derive boundary edges, and data closer to a middle of the layer may be giving more weight based on the edge detection. Accordingly, data that may be more accurate may be given greater weight during analysis. A modified model with HZ sections modified based on boundary positions, formation properties, and/or layering sequence may also be used, as described in more detail below.

Figure 17:
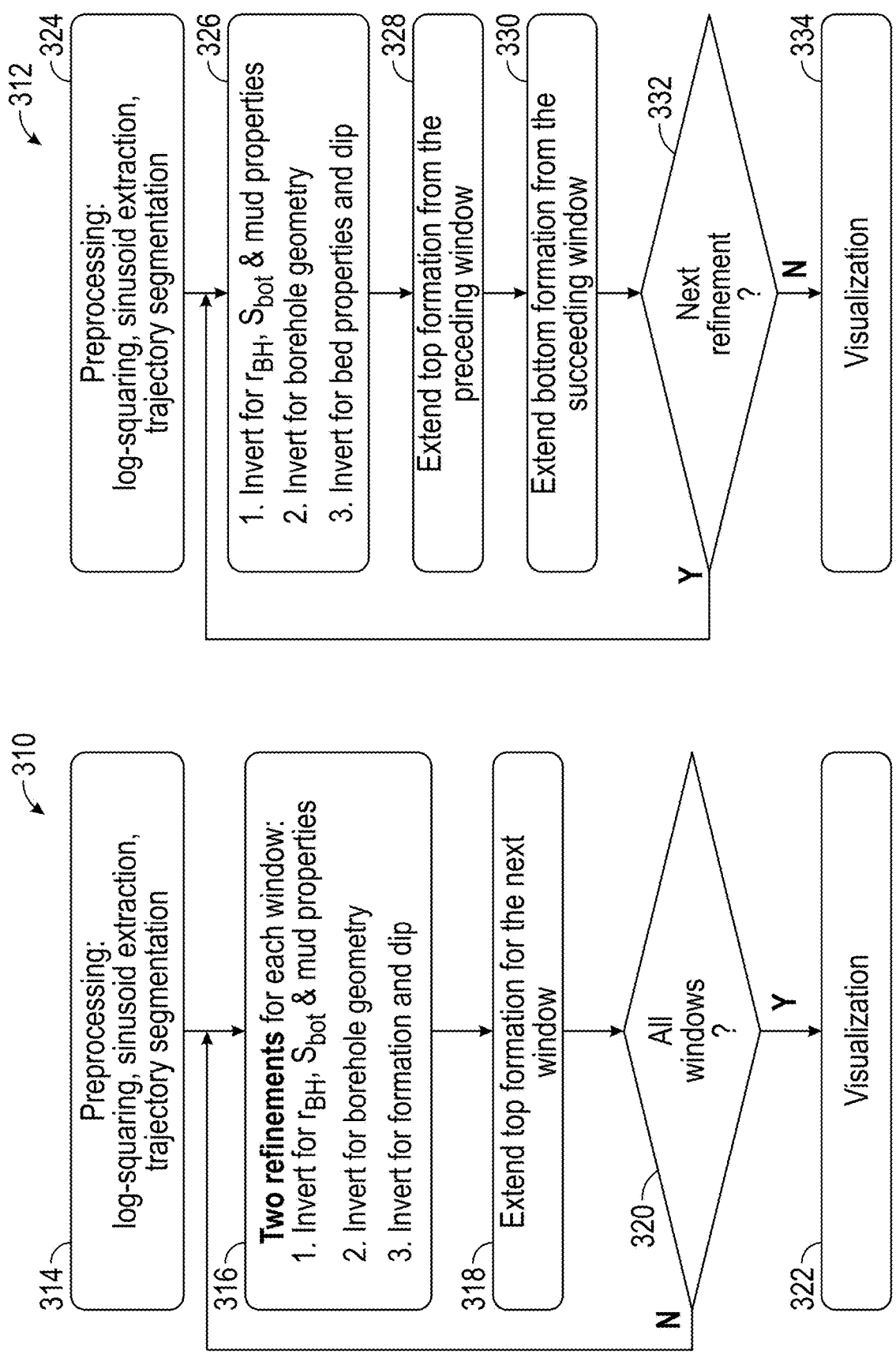
FIG. 17 depicts embodiments of a serial and a parallel process, including a parallel inversion process suitable for deriving visualizable formation models.

FIG. 17 depicts a serial workflow process 310 suitable for creating vizualizable models (e.g., curtain-section models) showing various layers, such as model 50 and layers 58. The figure also depicts a parallel workflow or process 312, equivalent to the serial process 310, for comparison. These workflows include HA workflows that can be used for sections 300, 302 as depicted on FIG. 16. The parallel workflow 312 may in addition to processing different windows in parallel following, for example, image segmentation, include having multiple passes connecting different windows to build a more consistent formation model. It should be noted that the process 312 above may be applicable to both HA and HZ workflows. The processes 310 and 312 may be implemented as computer instructions executable via a processor of the tool 114 and may be stored in a memory of the tool 114, and/or may be stored in memory 648 to be executed via processor 646, or in other external systems to be stored and processed by the external systems. As depicted, the process 310 may preprocess tool 114 data, apply a log-squaring (e.g., ROBB 152 log squaring), execute a sinusoid extraction, and then provide for a trajectory segmentation to derive one or more segmented images, such as image 158 (block 314) as described in more detail in FIG. 9. Each window may be inverted to derive 1) borehole radius $r_{bh}$, standoff $S_{bot}$, and mud properties; 2) borehole geometry; and 3) formation (e.g., layers) and dip (block 316). The block 316 may execute twice (e.g., two refinements) for enhanced accuracy. The process 310 may begin at a bottom and then extend a top of the formation for the next window via a sliding window approach (block 318). If the windows have been processed (decision 320), the process 310 may then provide for a visualization (block 322) including a graphical view of the formation, such as the graphical model 50. If not every window has been processed (decision 320), the process 310 may continue at block 316.

The parallel process 312 may process the windows in parallel. Accordingly, the windows may undergo pre-processing, log squaring, sinusoid extraction, and trajectory segmentation in parallel (block 324). The process 324 may then process each window in parallel to invert the window to derive 1) borehole radius $r_{bh}$, standoff $S_{bot}$, and mud properties; 2) borehole geometry; and 3) formation (e.g., layers) and dip (block 326). Process 312 may work from a middle section, rather than start at a bottom section like process 310. Accordingly, a top of the formation may be extended from a middle (e.g., preceding) window having more accurate data (block 328), and a bottom of the formation may be extended from the middle (e.g., succeeding) window (block 330). The process 312 may then go through multiple passes or refinements, as desired. For example, 2, 3, 4, 5, 6, 7, or more passes may be desired. Accordingly, if the number of passes or refinements has not been reached (decision 332), the process 312 may iterate back to block 326. Otherwise the process 312 may provide for a visualization (block 334) including a graphical view of the formation, such as the graphical model 50. By incorporating parallelization system (with automated task scheduling and load balancing) such as GSL, the process 312 may more quickly derive the visualizations 334, and may additionally improve accuracy.

Horizontal wells may stay within a few layers over a long trajectory segment and may cross the same boundary multiple times, creating artifacts such as railroad tracks, bull's eyes and/or reverse bull's eye on borehole images. These artifacts cause difficulty in extraction of dip and geometry from borehole images, and therefore create difficulties for practical use of automated inversion-based workflows. The reasons for the difficulty include variation of geometry, and the curvature of boundaries and their non-planar shape, in addition to lateral changes in formation density. The serial workflow or process 310 handles these by reducing the size of the processing window (e.g., to less than 3 feet). However, this may cause lateral inconsistency in the resulting interpretation, e.g., as seen in section 306. One way of handling structures with non-parallel boundaries is to identify a set of points in the image belonging to the same boundary, and then construct the boundary surface in 3D. The difficulty with this approach is in automating the process, as it currently uses manual (labor-intensive) interactions with the images and model.

Figure 18:
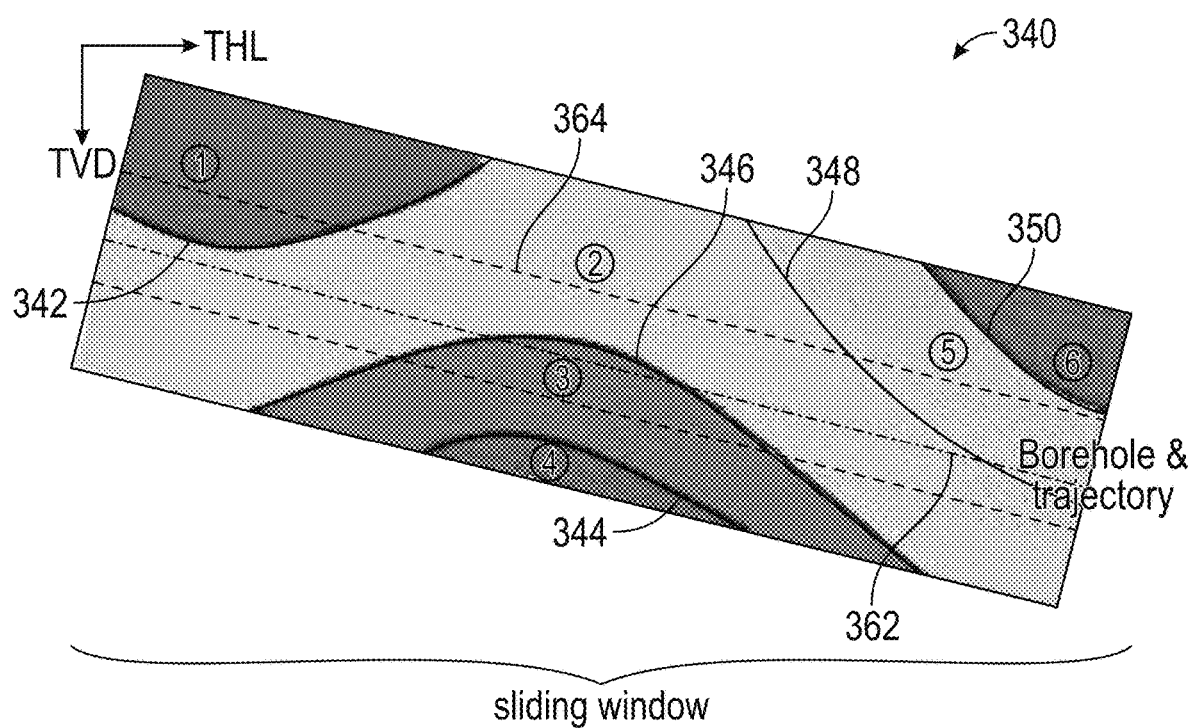
FIG. 18 illustrates an embodiment of a model parameterization derived via interval processing in HZ wells.
Figure 19:
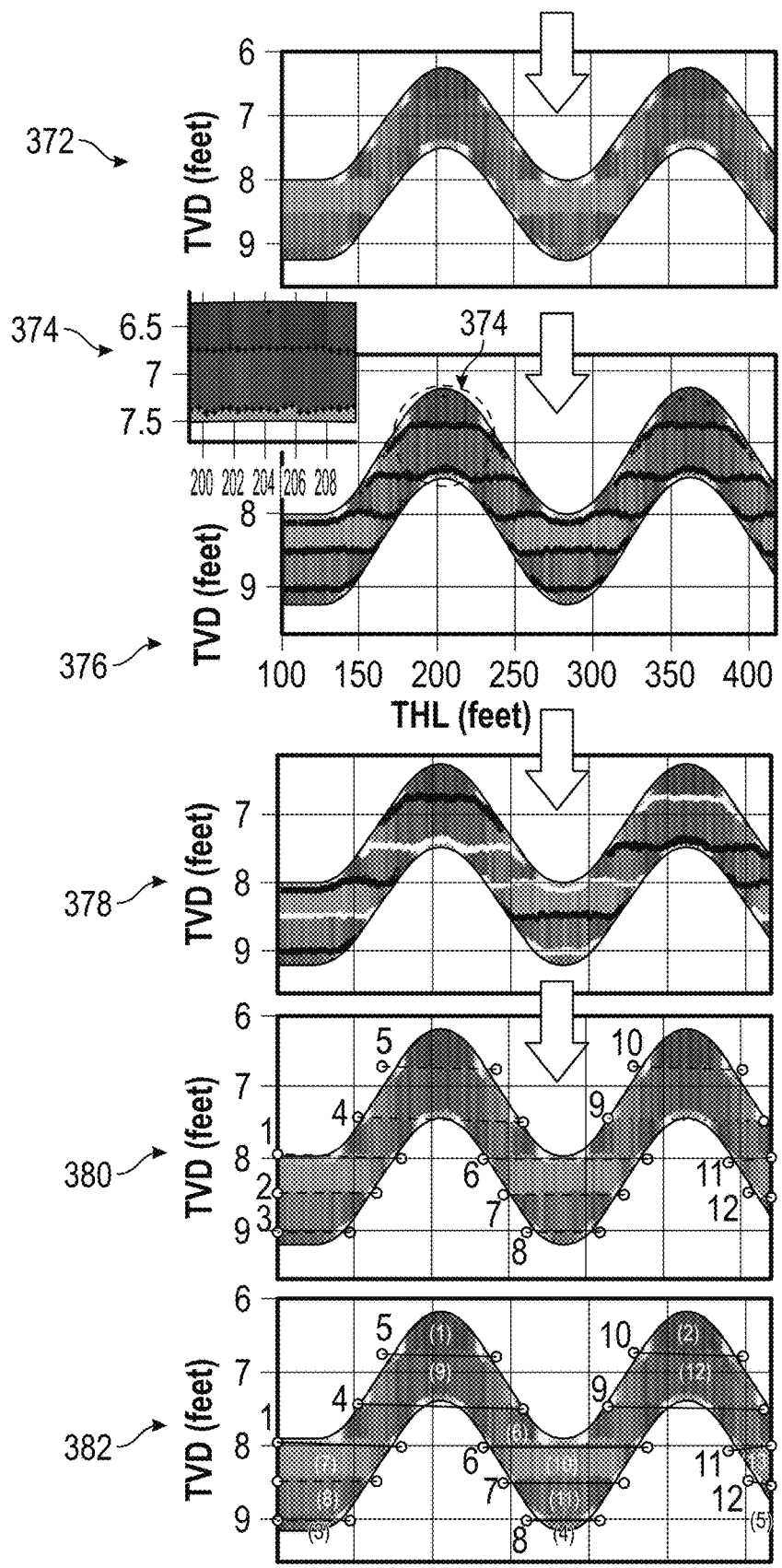
FIG. 19 illustrates a variety of images that may be derived at various activities of an enhanced pre-process workflow.
Figure 20:
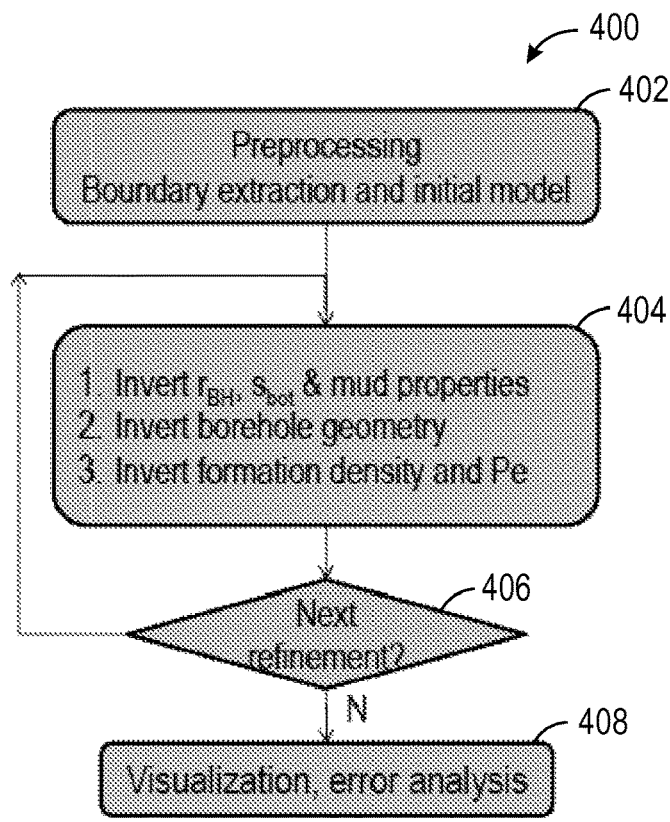
FIG. 20 illustrates an embodiment of an enhanced inversion workflow.
Figure 21:
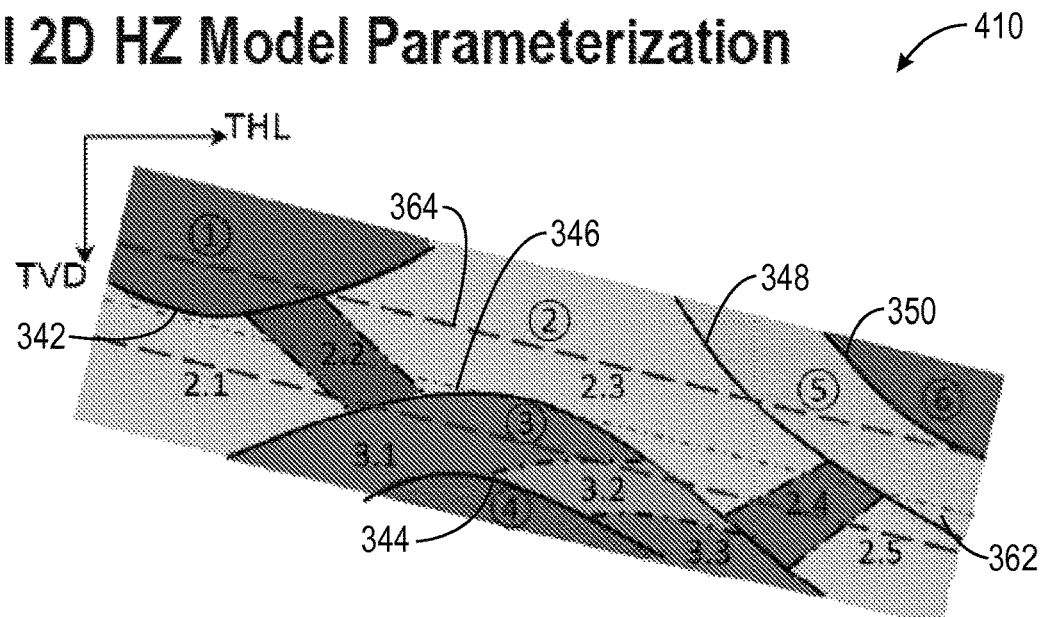
FIG. 21 illustrates a full 2D HZ model parameterization.
Figure 22:
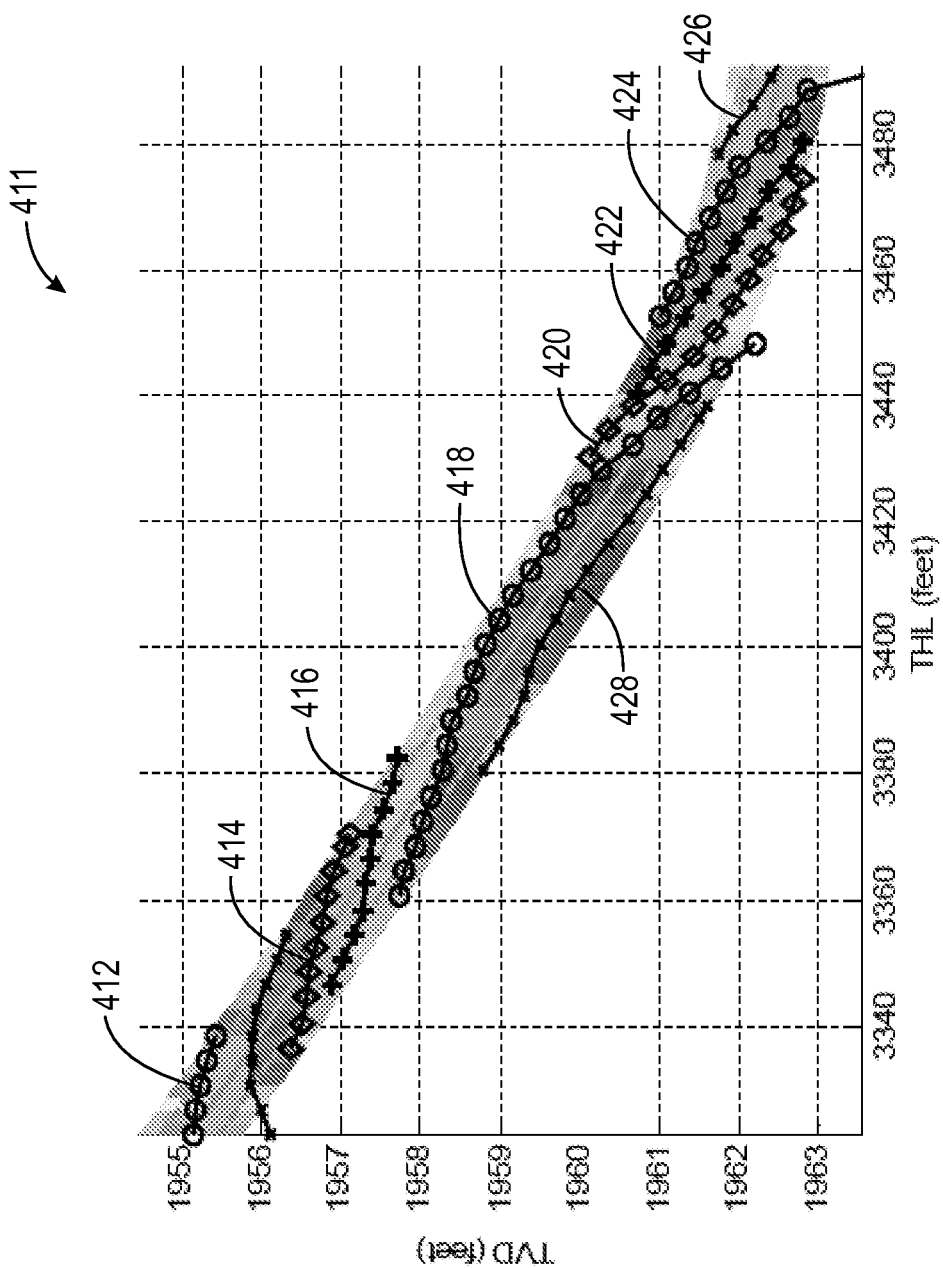
FIG. 22 illustrates an improved curtain-section model that may be derived via the techniques described herein.

FIGS. 18-22 illustrate an HZ workflow that may be used for processing zone 304 of the formation. Of course, other workflows as described in relation to FIG. 13-15 may also be used as HZ workflow. For example, FIG. 18 is a parameterization, FIG. 19 is a representation of applying pre-processing and the advanced front concept to the model building, FIG. 20 is a flowchart of certain of the techniques used, FIG. 21 is an extended 2D model parameterization, and FIG. 22 is an example of results with geometry of formation model after points belonging to the same boundaries are identified and grouped.

FIG. 18 illustrates embodiments of a new model parameterization 340, based on interval processing in HZ wells. Within each segment (e.g., segment 160), the formation model 340 is described by formation boundaries 342, 344, 346, 348, 350 and layer properties shown in circled numbers. The formation boundaries can be any arbitrary curves, thus improving accuracy. The layer properties are assumed to be uniform within each layer. Formation layers (e.g., six layers are shown with circled numbers inside the layers) do not have to be strictly parallel to each other, and can be truncated on any boundary 342, 344, 346, 348, 350. For non-uniform layers, sub-layers can be added to allow property variation within a layer. A tool trajectory 362 and a borehole geometry 364 are also shown.

An enhanced pre-processing and formation boundary extractions for the HZ workflow will be described hereinafter. In the HZ sections, the approximate curtain-section model 340 is obtained after squaring the azimuthal compensated density image (COMP) over small intervals. Formation boundaries 342, 344, 346, 348, 350 are extracted by comparing the true vertical depth (TVD) of bed boundaries between neighboring intervals and the densities above and below each boundary 342, 344, 346, 348, 350. A manual adjustment may be used to ensure boundary consistency. After local models are built, a topological model for the entire HZ interval is constructed. Each formation layer, defined by two or more boundaries, is assumed to have a unique density and photoelectric factor value. If desired, the layer can be further divided into sub-layers to add finer detail. The sub-layers are similar to main layers, allowing 2D structures. The initial structure can also be built from image contouring, used to construct boundaries from 3D contours.

The automated process can be followed by an interactive one, driven by a graphical user interface, with options to adjust the boundaries, or apply some geometry-healing techniques. Once the boundaries are defined and the initial model is constructed, layer density and photoelectric factor are found in the inversion workflow. An enhanced pre-processing workflow may be defined as follows:

1. Obtain curtain-section model from squaring azimuthal COMP data.
2. Identify points defining a formation boundary by comparing boundary TVDs and density contrast.
3. Filter out hanging points.
4. Manually adjust where appropriate to ensure consistency.
5. Sample formation boundaries within the predefined interval.
6. Build up the topological model for the entire HZ interval.
7. Each layer defined by two or more boundaries may be assumed to have unique properties.

The enhanced pre-processing workflow may be implemented as computer instructions executable via a processor of the tool 114 and may be stored in a memory of the tool 114, and/or may be stored in memory 648 to be executed via processor 646, or in other external systems to be stored and processed by the external systems. The images correlative to the activities in the enhanced pre-process workflow are illustrated in FIG. 19. For example, an image 370 may be squared (e.g., squaring of azimuthal COMP data) to obtain a curtain-section model 372. Points identifying a formation boundary may be identified, for example, by comparing boundary TVDs and density contrasts, as shown in more detail in section 374 of image 376. Hanging points may additionally be filtered, and image 376 may be manually adjusted, if desired, to derive image 378. Formation boundaries may be sampled within a predefined interval, as shown in image 380. A final topological model for the HZ interval may then be build up, so that each layer defined by two or more boundaries is assumed to have unique properties, as depicted in image 382.

The parameterization used to derive model 340 (shown in FIG. 18) may be further generalized to handle full 2D curtain-section geometry that may be used in HZ wells, as shown in FIG. 21. However, it is to be understood that the parameterization described can also be used for HA wells. Accordingly, an extended full 2D model parameterization is defined via polygonal shapes, and can be used to model any 2D shape, including lateral change of properties or cross-bedding in addition to the original model with curved boundaries. To further define and adjust this class of model a user friendly and intuitive interface may also be provided. More descriptions on the extended full 2D model parameterization is described below with reference to FIG. 21.

The inverted parameters are layer and zone densities and photoelectric factors, for the defined model geometry. Standard Gauss-Newton optimization with line search adaptive regularization and parameter constraints is used. The cost function is the weighted $L_2$-norm error between the measurements and the modeled responses over log points in each segment. An enhanced inversion workflow may include the following activities:

1. Invert borehole average radius and mud properties using the short-spacing density (SS), density correction (DRHO) and apparent volumetric photoelectric factor (UAPP) channels for every sector over the entire interval (e.g., every log points). Cylindrical borehole and uniform mud properties are assumed.
2. Invert for borehole geometry based on a staircase or harmonic geometry model using SS and DRHO channels for each sector and log points.
3. Invert densities and photoelectric factors of formation layers and zones using long-spacing density (LS), COMP and UAPP channels, using sector data for the entire interval.
4. Repeat activities numbered 1-3 above until parameters converge to a specified tolerance or until the specified maximum number of repetitions is reached. The inversion may be implemented as computer instructions executable via a processor of the tool 114 and may be stored in a memory of the tool 114, and/or may be stored in memory 648 to be executed via processor 646, or in other external systems to be stored and processed by the external systems. The inversion can also be run using a sliding window scheme to allow lateral property changes. It may be useful to depict a flowchart including embodiment of the activities above, as shown in FIG. 20. More specifically, FIG. 20 shows an embodiment of an enhanced inversion workflow 400 that includes the enhanced pre-processing workflow, a boundary extraction, and an initial model derivation (block 402). The workflow 400 may be implemented as computer instructions executable via a processor of the tool 114 and may be stored in a memory of the tool 114, and/or may be stored in memory 648 to be executed via processor 646, or in other external systems to be stored and processed by the external systems. The model may then include the activities 1, 2 and 3 described above (block 404). If parameters do not converge to the specified tolerance or if the specified maximum number of repetitions is not reached (decision 406), the process 400 may iterate back to block 404. If the parameters do converge to the specified tolerance or if the specified maximum number of repetitions is reached (decision 406), the process 400 may then provide a visualization and an error analysis (block 408).

FIG. 21 depicts an embodiment of an extended full 2D model parameterization 390. The extended full 2D model parameterization 410 may be derived by applying the activities above, including the enhanced pre-processing and/or process 400 to the same data used to generate the model 340 shown in FIG. 18. As illustrated, the extended full 2D model parameterization 410 is described by formation boundaries 342, 344, 346, 348, 350 and the topology of formation layers. There are six formation layers numbered with circular numbers shown, in which the second layer is further divided into five sub-layers (layers 2.1, 2.2, 2.3, 2.4, 2.5 show in dash dot lines) and the third layer is further divided into three sub-layers (layers 3.1, 3.2, 3.3 also shown in dash dot lines). The tool trajectory 362 and the borehole geometry 364 are also shown. As depicted model 410 may thus include certain sub-layers, for enhanced accuracy.

FIG. 22 shows an embodiment of a curtain-section model 410 derived from using field data and the application of the enhanced techniques described herein, such as the enhanced pre-process modeling used to derive FIG. 19 and/or the enhanced full 2D HZ model parameterization (e.g., process 400) used to derive FIG. 21. In the depicted embodiment, various boundaries 412, 414, 416, 418, 420, 422, 424, 426, 428 are displayed more accurately and efficiently, which may provide more accurate formation density measures in a more efficient manner. Accordingly, a geographical formation may be explored more accurately and in a faster manner.

Figure 23:
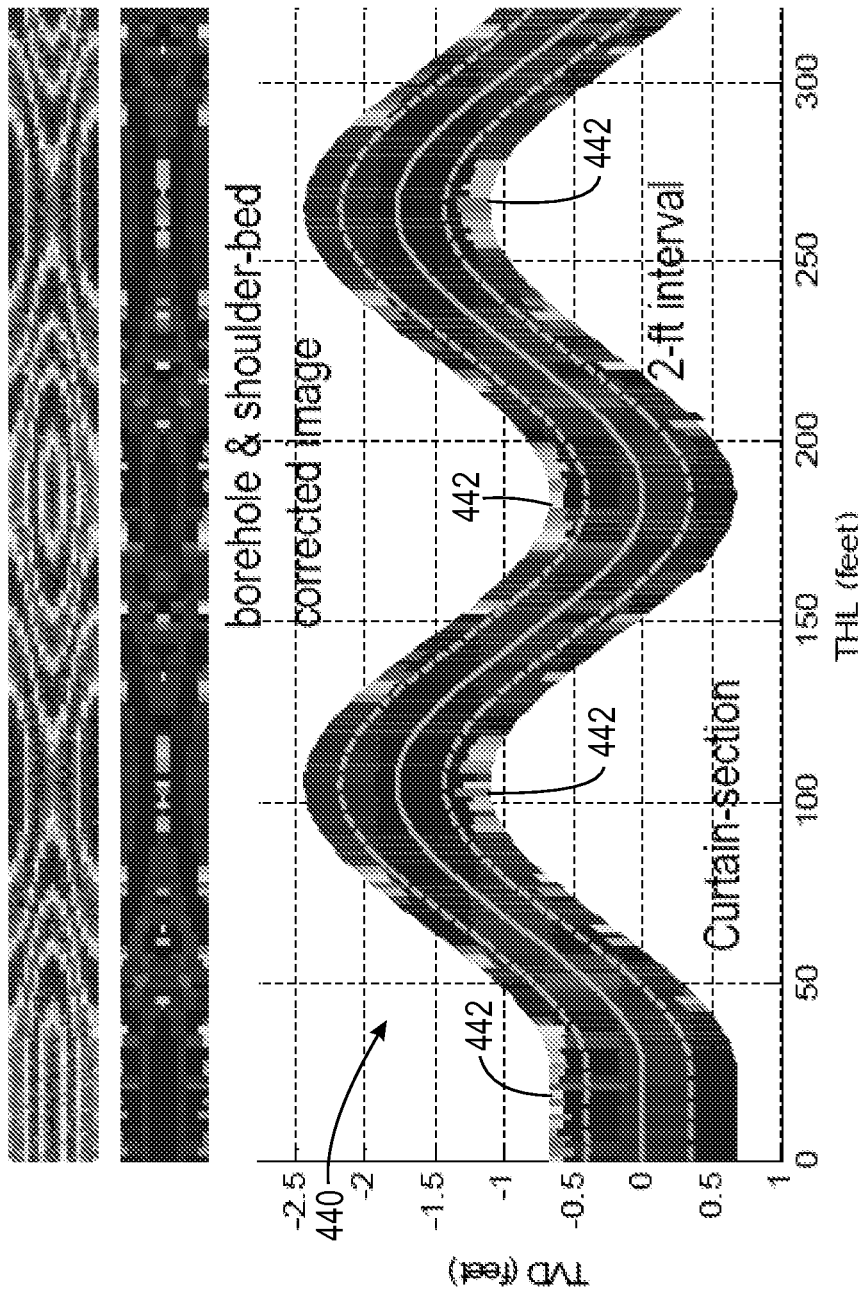
FIGS. 23-27 illustrate embodiments of various curtain-section models that may be used to validate the techniques described herein via synthetic data.
Figure 24:
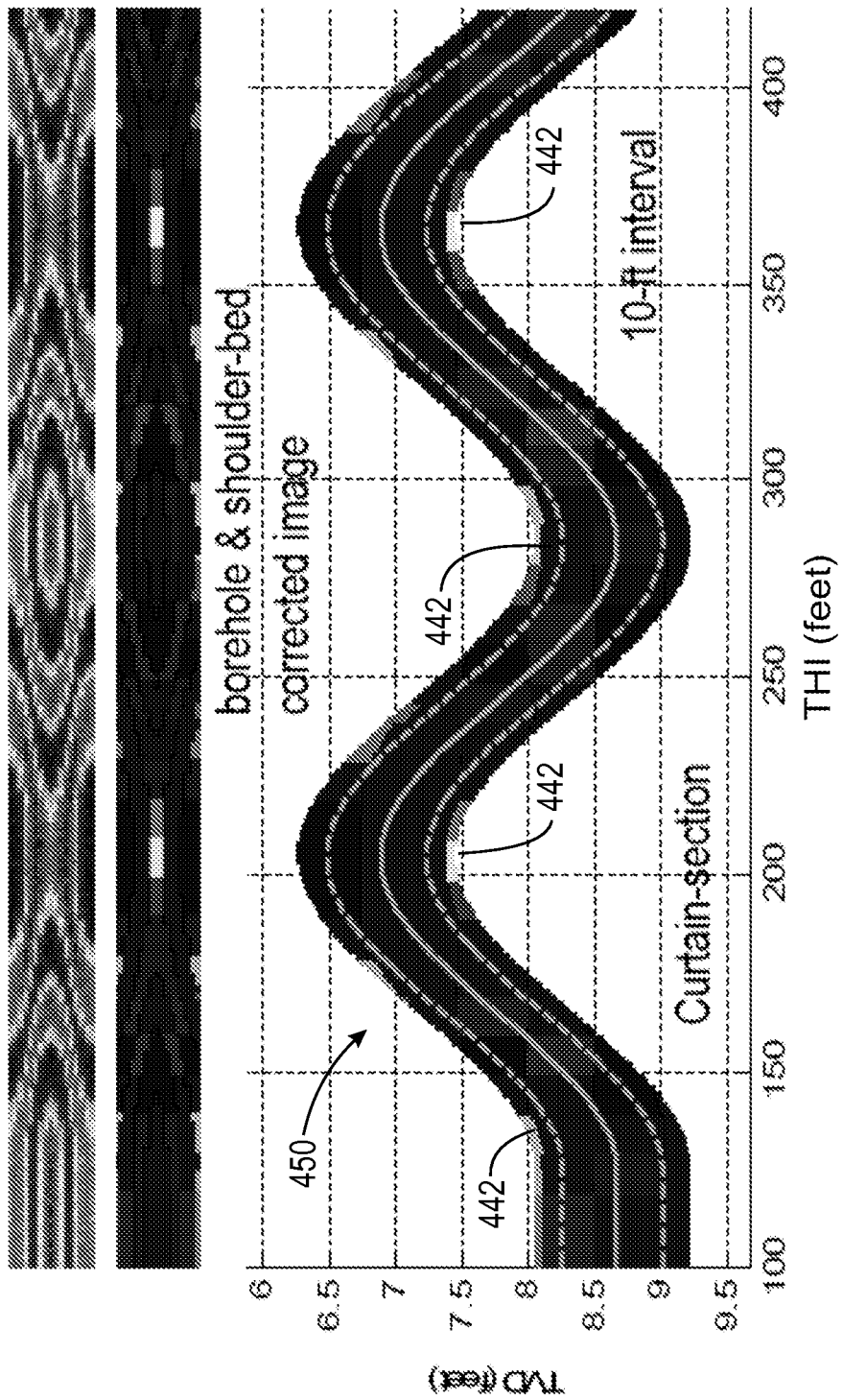
Figure 25:
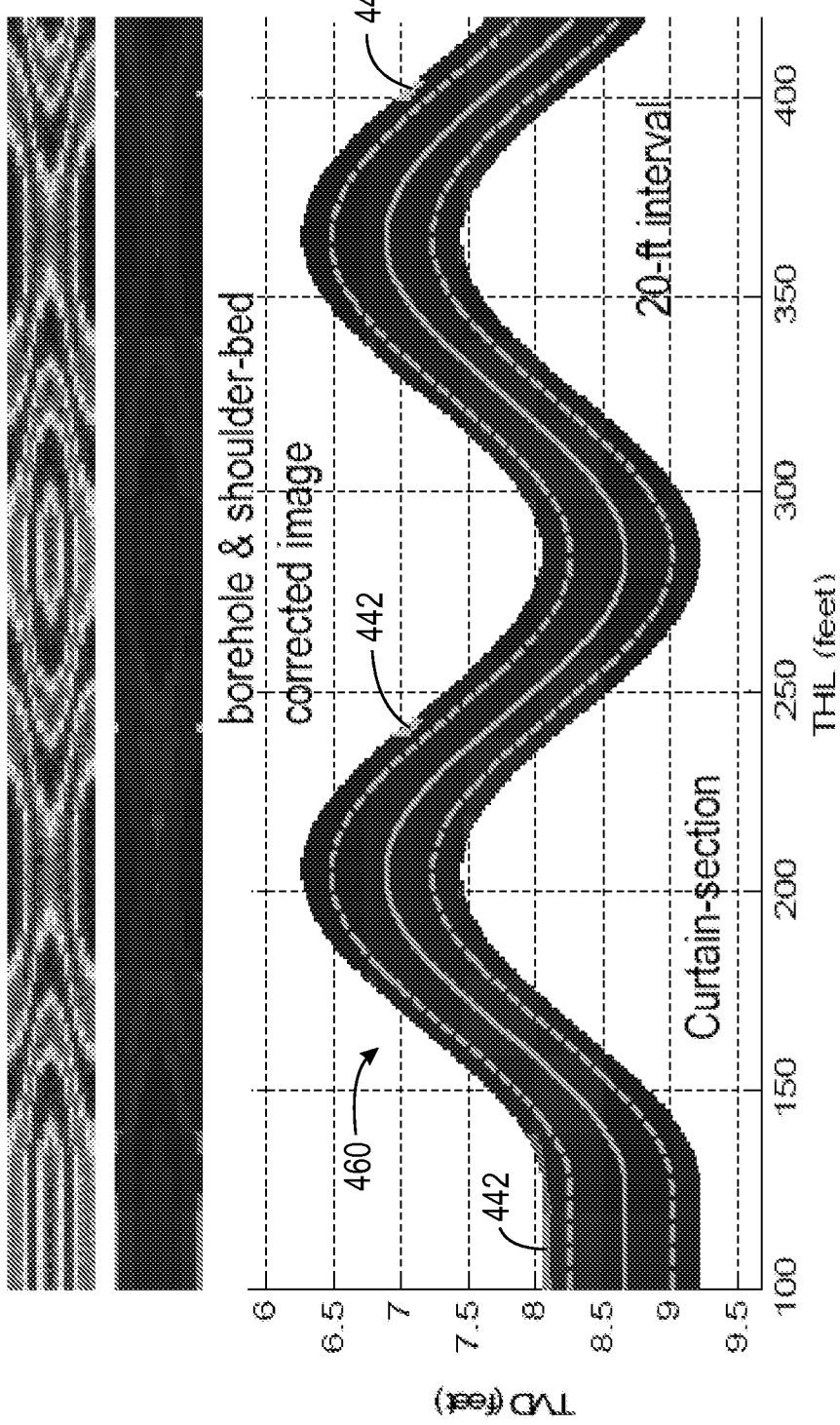
Figure 26:
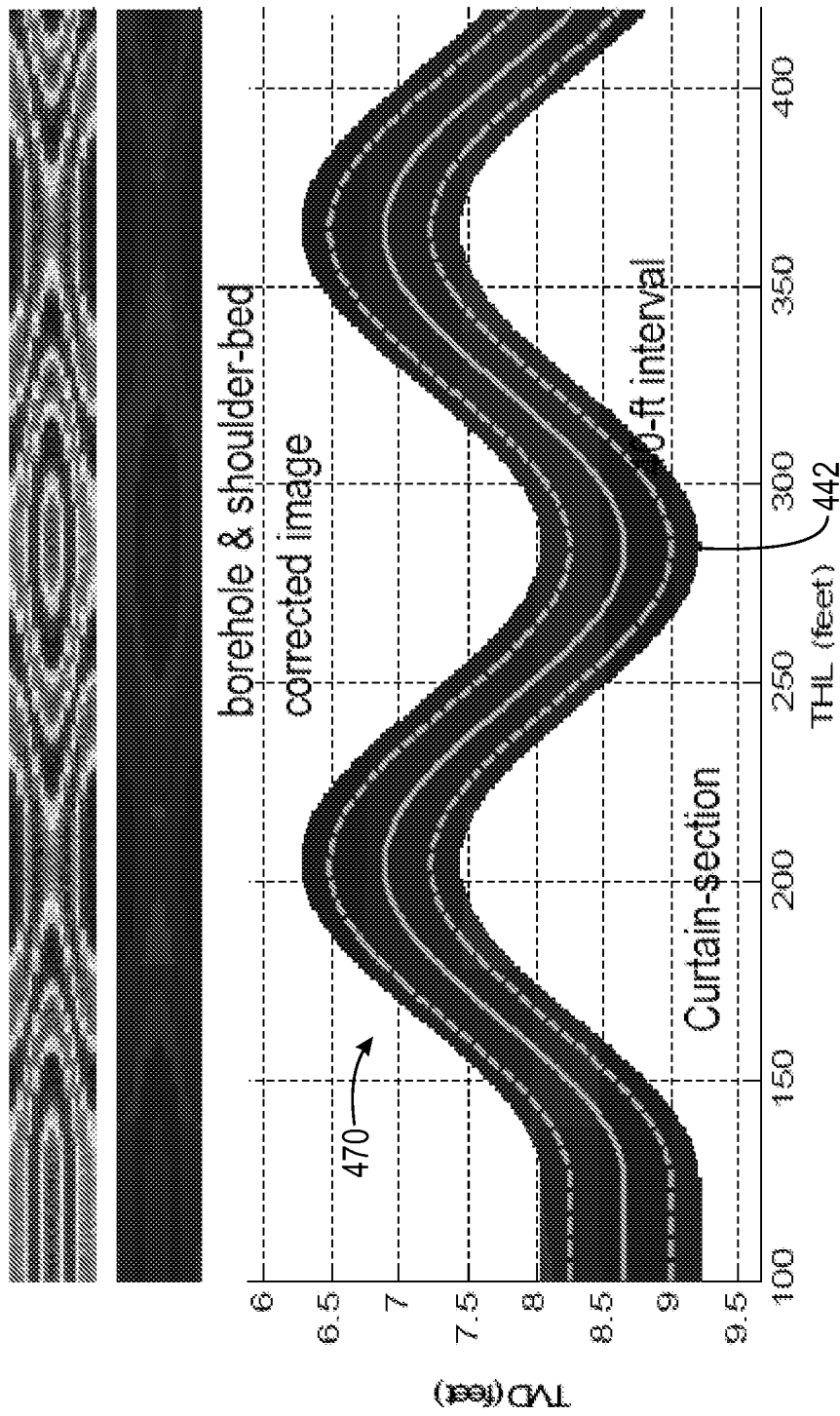
Figure 27:
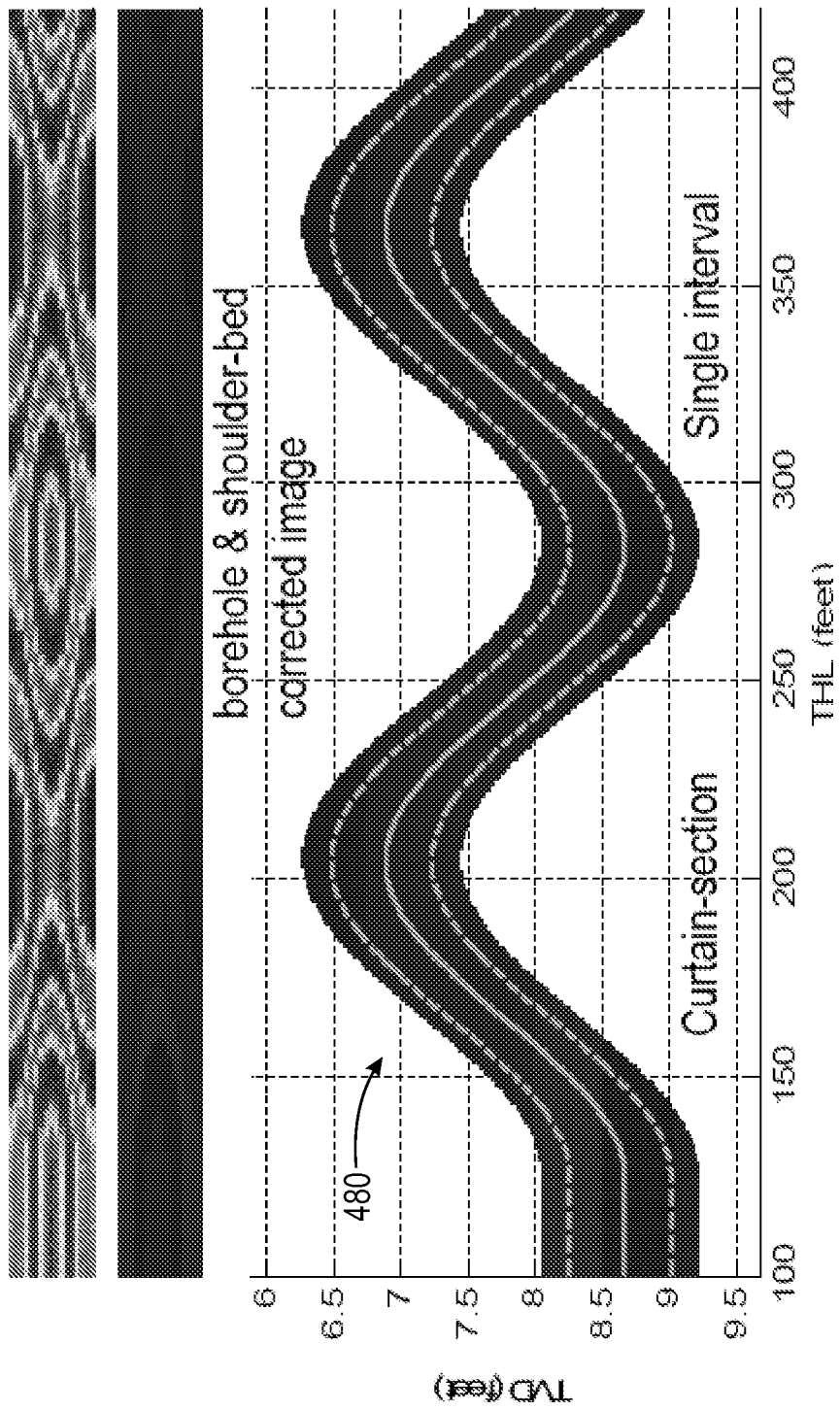

FIGS. 23-26 show embodiments of various curtain-section models that may be used to validate the techniques described herein via synthetic data. More specifically, FIG. 23 depicts a curtain-section model 440 that may have been derived without using the techniques described herein. According, a variety of blocks or artifacts 442 may be included. An improved 1D curtain-section model 450 is depicted in FIG. 24. The model 450 includes 10 ft. window interval processing, and shows less artifacts 442. Increasing processing to a 20 ft. window interval is shown in FIG. 25. A model 460, as depicted in FIG. 25, includes less artifacts 442 than models 440, 450. FIG. 26 shows a model 470 at 40 ft. window intervals, with minimal or artifacts 442. A model 480, as depicted in FIG. 27, may apply the 2D techniques described herein. As shown, the model 480 substantially minimizes or eliminates artifacts 442 in the synthetic data when 2D techniques are applied, even by using larger window intervals. By providing for more accurate and faster workflows, including workflows 130, 310, 312, and 400, the techniques described herein may enable an improved geophysical analysis of a formation.

Figure 28:
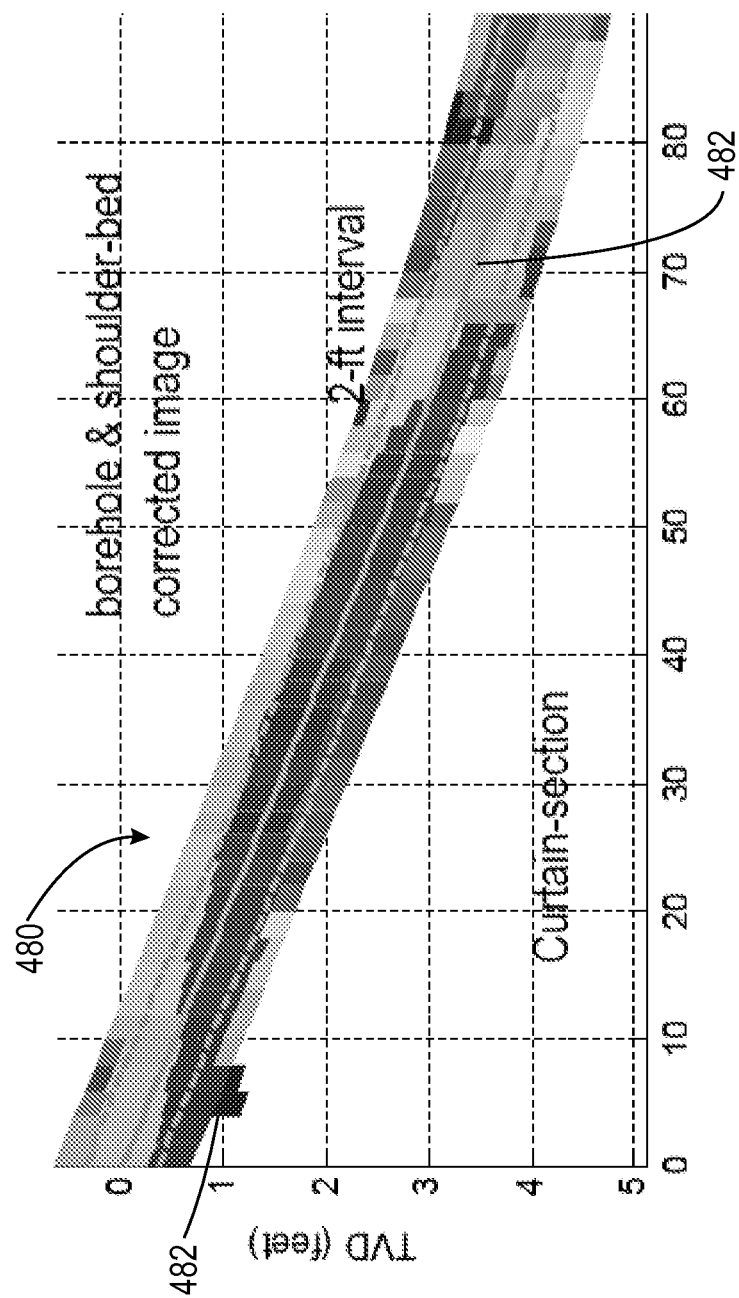
FIGS. 28-31 illustrate embodiments of various curtain-section models that may be used to validate the techniques described herein via field data.
Figure 29:
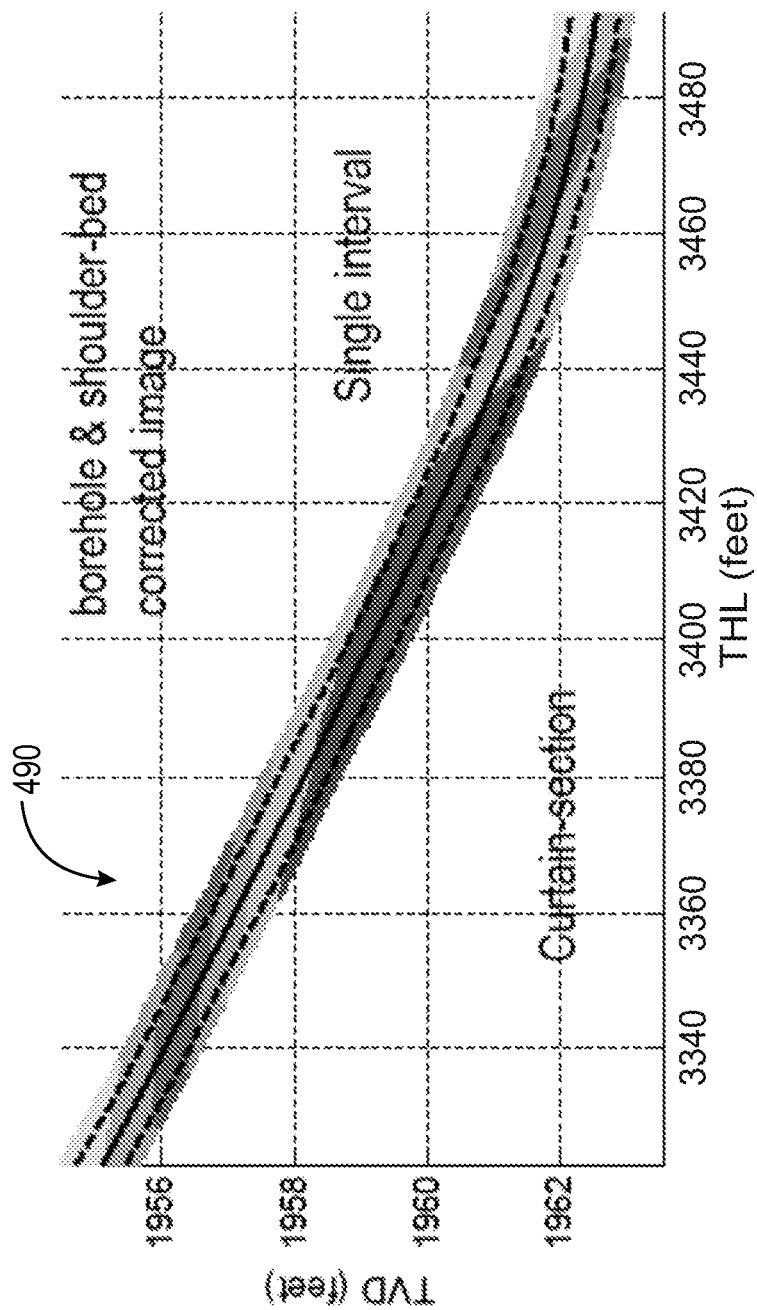
Figure 30:
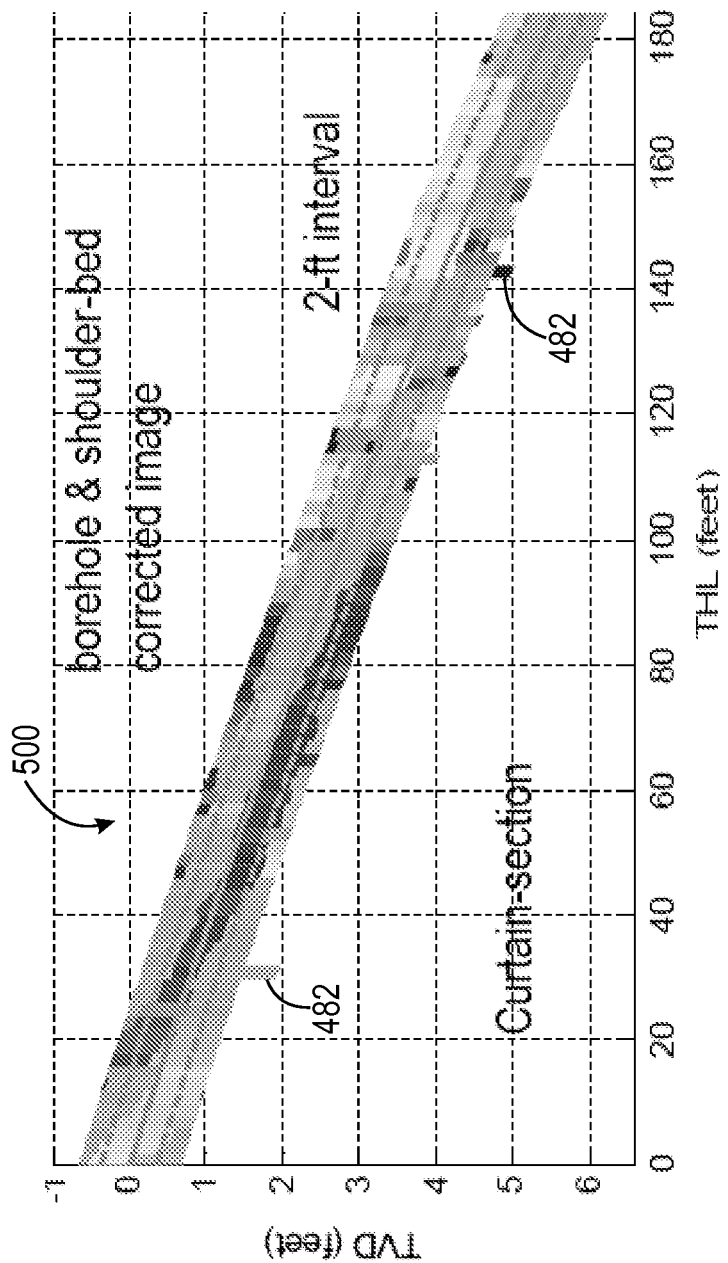
Figure 31:
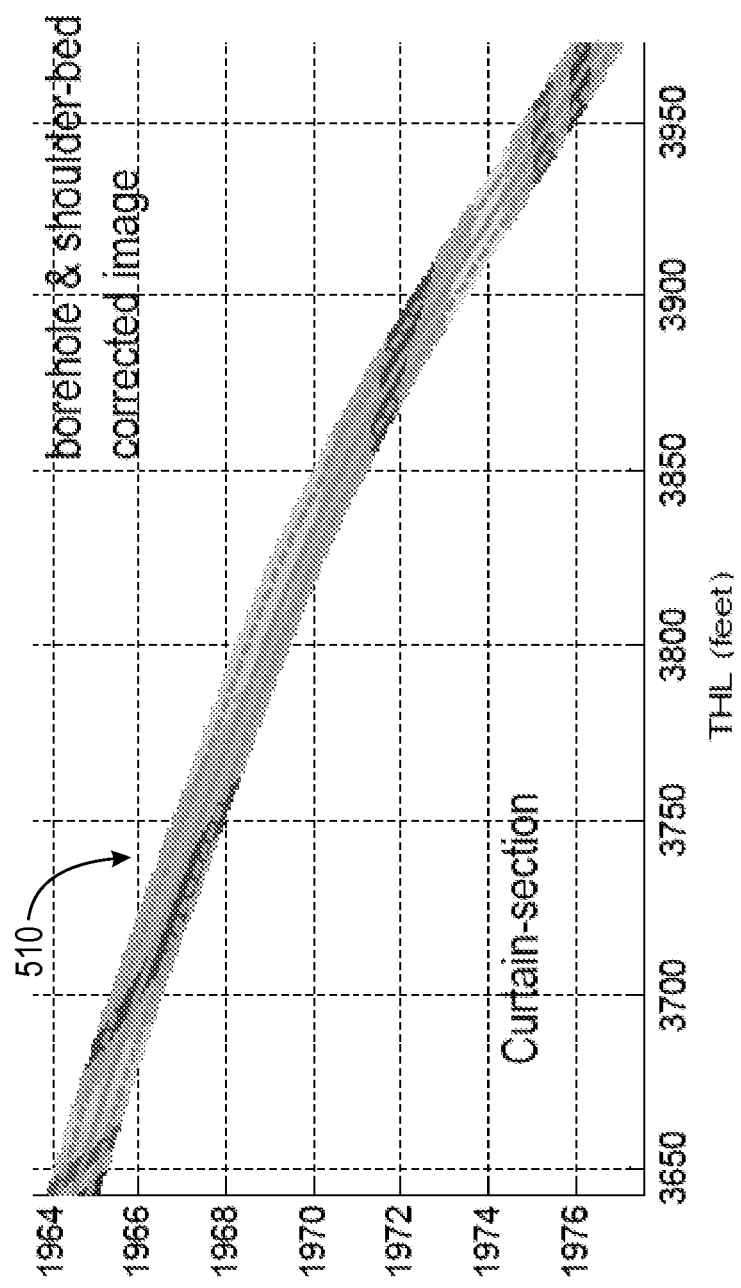

FIGS. 28-31 show embodiments of various curtain-section models that may be used to validate the techniques described herein via field data as opposed to synthetic data. More specifically, FIG. 28 depicts a model 480 derived without using the improved techniques described herein. The model 480 shows blocky boundaries and unwanted artifacts 482. In comparison, FIG. 29 shows a model 490 that may be derived using the same data as that used for model 480 but applying the improved techniques described herein, including workflows 130, 310, 312, and 400. As illustrated, the model 490 shows improved boundary visualizations and the elimination of the artifacts 482. FIG. 30 depicts a model 500 derived without using the improved techniques described herein. The model 500 also shows blocky boundaries and unwanted artifacts 482, similar to the model 480. In comparison, FIG. 31 depicts a model 510 that may be derived using the same data as that used for model 500 but applying the improved techniques described herein, including workflows 130, 310, 312, and 400. As illustrated, the model 510 shows improved boundary visualizations and the elimination of the artifacts 482. Indeed, field data validation, as shown in FIGS. 27-30, shows improvements in both accuracy as well as speed for the techniques described herein.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A method for characterizing a subterranean formation traversed by a wellbore, the method comprising:
   collecting data from the subterranean formation using a nuclear density tool, wherein the nuclear density tool is configured to collect data to form azimuthal images representative of a density of the formation;
   characterizing a section of the subterranean formation comprising data and images acquired in a high angle wellbore section, a horizontal wellbore section, or a combination thereof;
   performing a parallel inversion using apparent densities and volumetric photoelectric factor images to build a formation model, wherein the parallel inversion includes repeatedly extending the formation model from a first window of a plurality of image windows, wherein the parallel inversion comprises a high angle workflow that models high angle wellbore sections or a horizontal workflow that models horizontal wellbore sections,
   wherein performing the parallel inversion comprises processing the plurality of image windows in parallel, wherein each window is representative of formation density in a portion of the formation; and
   determining at least one property of the formation based on the parallel inversion, wherein the at least one property includes boundaries of a formation layer.

2. The method of claim 1, wherein performing the parallel inversion comprises:
   selecting a middle window of the plurality of image windows;
   extending a top of the formation model from the middle window using a preceding window data; and
   extending a bottom of the formation model from the middle window using a succeeding window data.

3. The method of claim 1,
   wherein performing the horizontal workflow comprises performing a horizontal well pre-processing workflow on the horizontal wellbore sections, wherein the pre-processing workflow comprises:
   obtaining a two-dimensional curtain-section model on a predefined interval from azimuthal squaring compensated density image data acquired on small intervals, wherein the predefined interval contains a plurality of small intervals, wherein the two-dimensional curtain-section model is configured to define layer boundaries with non-parallel curves;
   identifying points defining a formation boundary of the subterranean formation by comparing boundary true vertical depths (TVDs) and density contrast in adjacent sections of data sequentially;
   filtering out hanging points;
   sampling formation boundaries within the predefined interval;
   building up a topological model for each of the horizontal wellbore sections by identifying geometry and zones of the formation model; and
   determining at least a property of the formation based on the parallel inversion.

4. The method of claim 1, wherein performing the parallel inversion comprises performing an enhanced inversion workflow comprising at least one of following:
   inverting a borehole average radius and mud properties over an interval;
   inverting for borehole geometry based on a staircase or harmonic geometry model for each sector and log points; and
   inverting densities and photoelectric factors of formation layers.

5. The method of claim 1, wherein the formation model comprises a full two-dimensional (2D) model.

6. The method of claim 5, wherein the full 2D model is derived by applying a plurality of polygonal shapes to define formation model geometry and zones, wherein the formation model geometry and zones are extracted automatically, manually, or a combination thereof.

7. The method of claim 1, wherein performing the parallel inversion comprises processing overlapping windows.

8. The method of claim 1, wherein performing the parallel inversion comprises performing a fast-forward nuclear density tool response modeling.

9. The method of claim 8, wherein the fast-forward response modeling comprises applying pre-computed first and second order sensitivity functions.

10. The method of claim 1, comprising providing a visualization of the formation model, wherein the visualization comprises a 1-dimensional (1D) visualization, a 2-dimensional (2D) visualization, a 3-dimensional (3D) visualization of measured and reconstructed data and/or formation models, an error visualization, a misfit visualization, or a combination thereof.

11. The method of claim 1, comprising characterizing the high angle wellbore sections via high angle parametric models having a relative angle between tool trajectory inclination and formation dip of less than 88° and more than 92°, or characterizing the horizontal wellbore sections via horizontal parametric models having a relative angle between tool trajectory inclination and formation dip of between 88° and 92°.

12. The method of claim 1, comprising performing an inversion of a full 2D model built using a superposition of 1D formation models.

13. The method of claim 1, wherein the parallel inversion comprises a high angle workflow that models high angle wellbore sections and a horizontal workflow that models horizontal wellbore sections.

14. The method of claim 1, wherein the at least one property of the formation further comprises one of a density or a photoelectric factor of the layer.

15. A non-transitory, tangible computer readable storage medium, comprising instructions configured to:
   collect data from a subterranean formation using a detector to form azimuthal images representative of a density of the formation;
   characterize a section of the subterranean formation comprising data and images acquired in a high angle wellbore section, a horizontal wellbore section, or a combination thereof;
   perform a parallel inversion on a plurality of image windows using apparent densities and volumetric photoelectric factor images to build a formation model, wherein the parallel inversion includes repeatedly extending the formation model from a first window of the plurality of image windows, wherein the parallel inversion comprises a high angle workflow that models high angle wellbore sections or a horizontal workflow that models horizontal wellbore sections; and
   determine at least a property of the formation based on the parallel inversion,
   wherein performing the parallel inversion comprises processing a plurality of image windows in parallel, wherein each window is representative of formation density in a portion of the formation.

16. The storage medium of claim 15, wherein the instructions configured to perform the horizontal workflow comprise instructions configured to perform a horizontal well pre-processing workflow on the horizontal wellbore sections by:
   obtaining a curtain-section model from azimuthal squaring compensated density image data;
   identifying points defining a formation boundary of the subterranean formation by comparing boundary true vertical depths (TVDs) and density contrast in adjacent sections of data sequentially;
   filtering out hanging points;
   sampling formation boundaries within a predefined interval; and
   building up a topological model for each of the horizontal wellbore sections by identifying geometry and zones of the formation model.

17. The storage medium of claim 15, comprising instructions configured to perform an inversion of a full two dimensional model built using a superposition of 1D formation models.

18. A downhole measurement system, comprising:
   a gamma ray source configured to generate gamma rays into a subterranean formation;
   a detector configured to detect a radiation from the subterranean formation; and
   a processor configured to:
      collect data from the subterranean formation using the detector to form an azimuthal image representative of a density of the formation;
      characterize a section of the subterranean formation comprising data and images acquired in a high angle wellbore section, a horizontal wellbore section, or a combination thereof;
      perform a parallel inversion using apparent densities and volumetric photoelectric factor images to build a formation model, wherein the parallel inversion includes repeatedly extending the formation model from a first window of a plurality of image windows, wherein the parallel inversion comprises a high angle workflow that models high angle wellbore sections or a horizontal workflow that models horizontal wellbore sections, wherein performing the parallel inversion comprises processing the plurality of image windows in parallel, wherein each window are representative of formation density in a portion of the formation; and
      determine at least one property of the formation based on the parallel inversion, wherein the at least one property includes boundaries of a formation layer.

19. The system of claim 18, wherein the processor is configured so that
   performing the parallel inversion comprises performing a horizontal well pre-processing workflow on the horizontal wellbore sections by obtaining a 2D curtain-section model on a predefined interval from azimuthal squaring compensated density image acquired on small intervals, wherein the predefined interval contains a plurality of small intervals, and wherein the 2D curtain-section model is configured to define layer boundaries with non-parallel curves; identifying points defining a formation boundary of the subterranean formation by comparing boundary true vertical depths (TVDs) and density contrast; filtering out hanging points; sampling formation boundaries within a predefined interval; and building up a topological model for each of the horizontal wellbore sections.

20. The system of claim 19, wherein the formation model comprises a full two-dimensional (2D) model, wherein the full 2D model is derived by applying a plurality of polygonal shapes to define formation model geometry and zones, wherein the formation model geometry and zones are extracted automatically, manually, or a combination thereof.

21. The system of claim 18, wherein performing the parallel inversion comprises performing an enhanced inversion workflow comprising: inverting a borehole average radius and mud properties using the short-spacing density (SS), density correction (DRHO), and apparent volumetric photoelectric factor (UAPP) data for sectors over an interval; inverting for borehole geometry based on a staircase or harmonic geometry model using SS and DRHO data for each sector and log points; and inverting densities and photoelectric factors of formation layers using long-spacing density (LS), COMP, and UAPP data.

* * * * *